US012613516B2

(12) United States Patent
Kiritani et al.

(10) Patent No.: US 12,613,516 B2
(45) Date of Patent: Apr. 28, 2026

(54) LINE MANAGEMENT ASSISTANCE DEVICE, LINE MANAGEMENT ASSISTING METHOD, AND RECORDING MEDIUM

(71) Applicant: Mitsubishi Electric Corporation, Tokyo (JP)

(72) Inventors: Jun Kiritani, Tokyo (JP); Hirohiko Ito, Tokyo (JP); Taro Shibi, Tokyo (JP); Takashi Saeki, Tokyo (JP); Hidematsu Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 521 days.

(21) Appl. No.: 18/266,604

(22) PCT Filed: Jun. 15, 2021

(86) PCT No.: PCT/JP2021/022741
§ 371 (c)(1),
(2) Date: Jun. 12, 2023

(87) PCT Pub. No.: WO2022/264286
PCT Pub. Date: Dec. 22, 2022

(65) Prior Publication Data
US 2024/0045409 A1     Feb. 8, 2024

(51) Int. Cl.
*G05B 23/00*     (2006.01)
*G05B 19/418*     (2006.01)
*G05B 23/02*     (2006.01)

(52) U.S. Cl.
CPC ......... *G05B 23/02* (2013.01); *G05B 19/4183* (2013.01)

(58) Field of Classification Search
CPC ................ G05B 23/02; G05B 19/4183; G05B 19/4184; G05B 23/0216; Y02P 90/02
See application file for complete search history.

(56) References Cited

U.S. PATENT DOCUMENTS 5,442,561 A * 8/1995 Yoshizawa ............. G06Q 10/06
700/100
2018/0088567 A1* 3/2018 Li .................... G05B 19/41885
(Continued)

FOREIGN PATENT DOCUMENTS

JP     2015-119279 A     6/2015
JP     2015-192449 A     11/2015
(Continued)

OTHER PUBLICATIONS

International Search Report and Written Opinion mailed on Sep. 7, 2021, received for PCT Application PCT/JP2021/022741, filed on Jun. 15, 2021, 8 pages including English Translation.
(Continued)

*Primary Examiner* — Mi'schita' Henson
(74) *Attorney, Agent, or Firm* — XSENSUS LLP

(57) ABSTRACT
A line management assistance device (100) is connectable to at least two sensors installed on a line. The line management assistance device (100) includes a receiver (11) that receives a management condition specified as a condition for managing the line, and a display (12) that displays assistance information indicating a list of candidates for a sensor to be used to manage the line. The candidates are one or more sensors preassociated with a use condition of preregistered use conditions for the at least two sensors. The use condition has a degree of similarity to the management condition exceeding a threshold.

6 Claims, 26 Drawing Sheets

(56) References Cited

U.S. PATENT DOCUMENTS

| 2018/0259944 | A1 | | 9/2018 | Oka | |
| 2019/0294436 | A1 | | 9/2019 | Oda et al. | |
| 2021/0144209 | A1 | | 5/2021 | Yamato | |
| 2021/0323771 | A1 | * | 10/2021 | Zhao | ...................... B65G 37/00 |

FOREIGN PATENT DOCUMENTS

| JP | 2017-102668 | A | 6/2017 |
| JP | 2018-097705 | A | 6/2018 |
| JP | 2018-097733 | A | 6/2018 |
| JP | 2019-028970 | A | 2/2019 |
| JP | 2019-113950 | A | 7/2019 |
| JP | 2020-078089 | A | 5/2020 |
| WO | 2018/225192 | A1 | 12/2018 |

OTHER PUBLICATIONS

Notice of Reasons for Refusal mailed on Dec. 21, 2021, received for JP Application 2021-565830, 6 pages Including English Translation.
Decision to Grant mailed on May 17, 2022, received for JP Application 2021-565830, 5 pages including English Translation.

* cited by examiner

REGISTRATION PROCESSING

S11

LINE REGISTRATION PROCESSING

S12

PROCESS REGISTRATION PROCESSING

S13

USE REGISTRATION PROCESSING

S14

INSTALLED-SENSOR REGISTRATION PROCESSING

S15

ASSOCIATED-SENSOR REGISTRATION PROCESSING

END

FIG.5

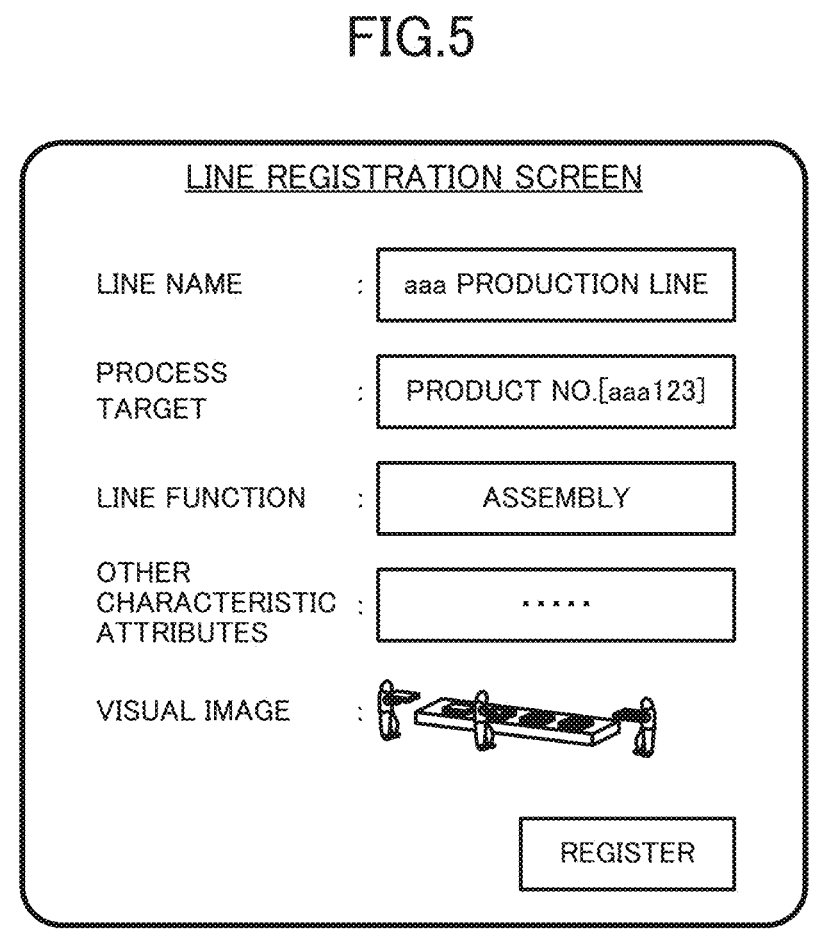

LINE REGISTRATION SCREEN

LINE NAME            :  | aaa PRODUCTION LINE |

PROCESS
TARGET              :  | PRODUCT NO.[aaa123] |

LINE FUNCTION       :  | ASSEMBLY |

OTHER
CHARACTERISTIC      :  | . . . . . |
ATTRIBUTES

VISUAL IMAGE        :

| REGISTER |

FIG.6

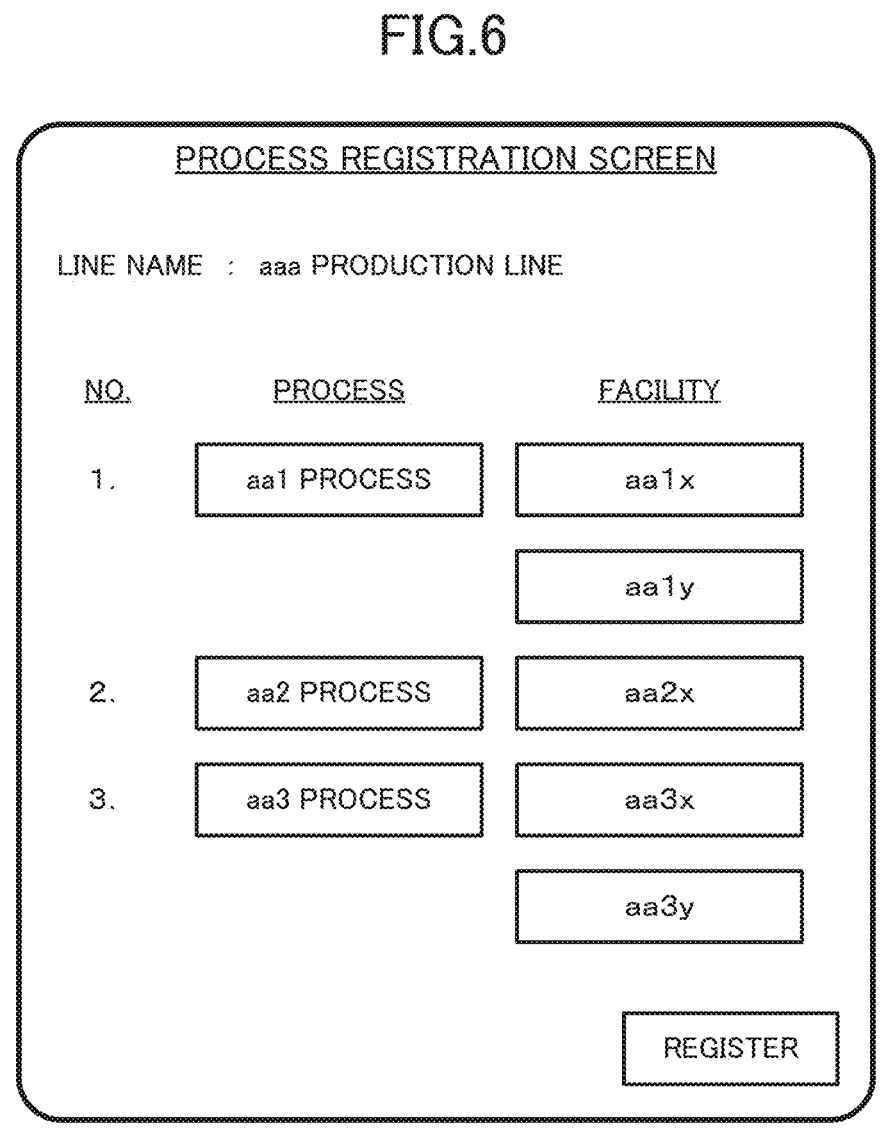

<u>PROCESS REGISTRATION SCREEN</u>

LINE NAME ： aaa PRODUCTION LINE

| <u>NO.</u> | <u>PROCESS</u> | <u>FACILITY</u> |
|------|-----------|----------|
| 1. | aa1 PROCESS | aa1x |
|  |  | aa1y |
| 2. | aa2 PROCESS | aa2x |
| 3. | aa3 PROCESS | aa3x |
|  |  | aa3y |

REGISTER

FIG.7

USE REGISTRATION SCREEN

LINE NAME   :  aaa PRODUCTION LINE

PROCESS NAME    :  aa1 PROCESS

FACILITY  :  aa1x

| NO. | USE | REMARKS |
|-----|-----|---------|
| 1. | aa1 PROCESS START TIME | · · · · · |
| 2. | aa1 PROCESS END TIME | · · · · · |
| 3. | LOT START TIME | · · · · · |
| 4. | LOT END TIME | · · · · · |
| 5. | IN-OPERATION | · · · · · |
| 6. | NON-OPERATION | · · · · · |

REGISTER

FIG.8

| LINE NAME | PROCESS | FACILITY | USE |
|---|---|---|---|
| aaa PRODUCTION LINE | aa1 PROCESS | aa1x | aa1 PROCESS START TIME |
| | | | aa1 PROCESS END TIME |
| | | | LOT START TIME |
| | | | LOT END TIME |
| | | | IN-OPERATION |
| | | | NON-OPERATION |
| | | | ⋮ |
| | | aa1y | BBB |
| | | | ⋮ |
| | aa2 PROCESS | aa2x | CCC |
| | | | ⋮ |
| | aa3 PROCESS | aa3x | DDD |
| | | | ⋮ |
| | | aa3y | EEE |
| | | | ⋮ |
| ⋮ | ⋮ | ⋮ | ⋮ |

Figure 9:
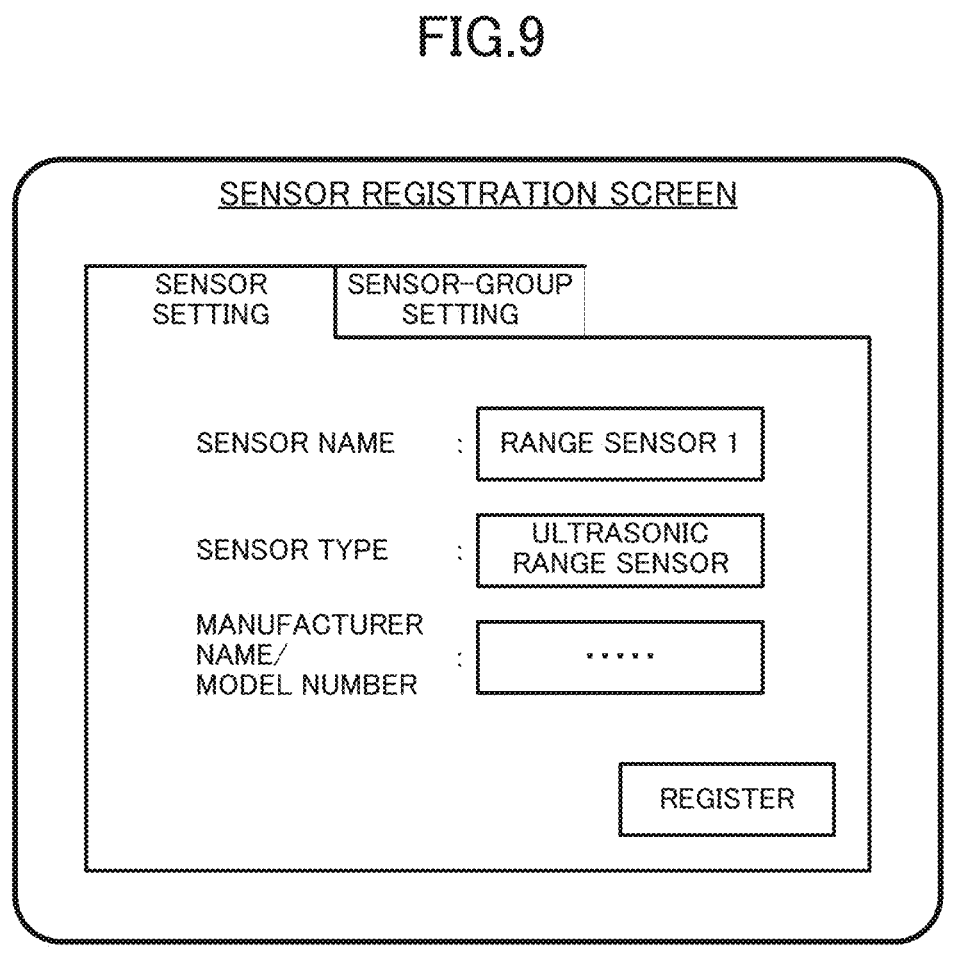

SENSOR REGISTRATION SCREEN

SENSOR SETTING | SENSOR-GROUP SETTING

SENSOR NAME : RANGE SENSOR 1

SENSOR TYPE : ULTRASONIC RANGE SENSOR

MANUFACTURER NAME/ MODEL NUMBER : . . . . .

REGISTER

FIG.10

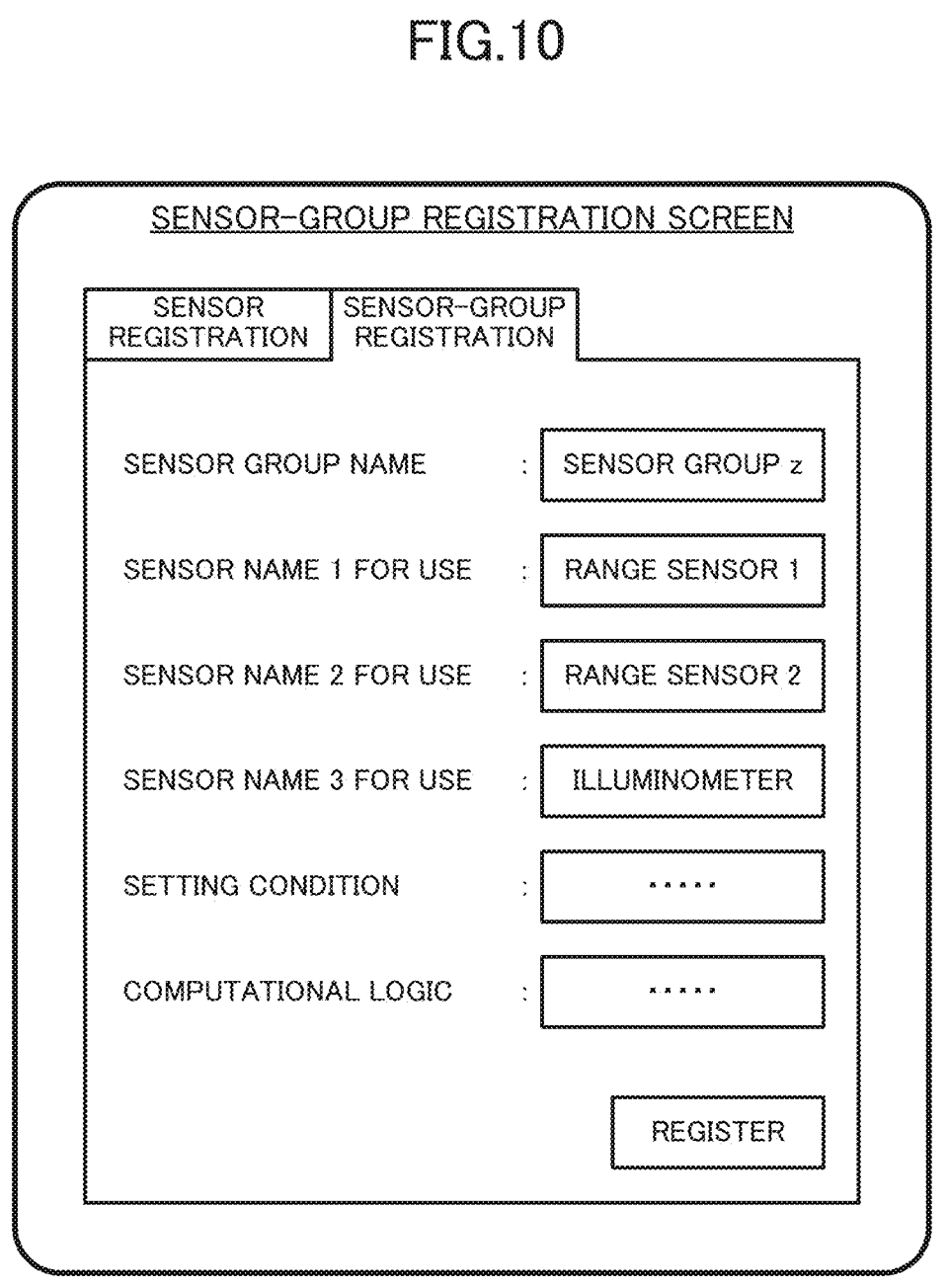

SENSOR–GROUP REGISTRATION SCREEN

| SENSOR REGISTRATION | SENSOR–GROUP REGISTRATION |
|---|---|

SENSOR GROUP NAME : SENSOR GROUP z

SENSOR NAME 1 FOR USE : RANGE SENSOR 1

SENSOR NAME 2 FOR USE : RANGE SENSOR 2

SENSOR NAME 3 FOR USE : ILLUMINOMETER

SETTING CONDITION : · · · · ·

COMPUTATIONAL LOGIC : · · · · ·

REGISTER

144

| SENSOR NAME | SENSOR TYPE | MANUFACTURER NAME/ MODEL NUMBER | |
|---|---|---|---|
| RANGE SENSOR 1 | ULTRASONIC RANGE SENSOR | . . . | |
| RANGE SENSOR 2 | . . . | . . . | |
| ILLUMINOMETER | . . . | . . . | |
| DEPTH SENSOR | . . . | . . . | |
| RANGE SENSOR 1 | . . . | . . . | |
| RANGE SENSOR 1 | . . . | . . . | |
| ⋮ | ⋮ | ⋮ | |
| SENSOR GROUP NAME | SENSOR NAME FOR USE | SETTING CONDITION | COMPUTATIONAL LOGIC |
| SENSOR GROUP z | RANGE SENSOR 1 | . . . | . . . |
| | RANGE SENSOR 2 | | |
| | ILLUMINOMETER | | |
| ⋮ | ⋮ | ⋮ | ⋮ |

| SENSOR NAME | | |
|---|---|---|
| RANGE SENSOR 1 | ⋮ | ⋮ |
| RANGE SENSOR 2 | ⋮ | ⋮ |
| ILLUMINOMETER | ⋮ | ⋮ |
| DEPTH SENSOR | ⋮ | ⋮ |
| RANGE SENSOR 1 | ⋮ | ⋮ |
| RANGE SENSOR 1 | ⋮ | ⋮ |
| ⋯ | ⋯ | ⋯ |

| SENSOR GROUP NAME | SENSOR NAME FOR USE | ⋮ | ⋮ |
|---|---|---|---|
| SENSOR GROUP z | RANGE SENSOR 1 | ⋮ | ⋯ |
| | RANGE SENSOR 2 | | |
| | ILLUMINOMETER | ⋯ | ⋯ |
| ⋯ | | | |

145

| USE DATA ACQUISITION MEANS | ADVANTAGE/ DISADVANT- AGE AND CONCERN |
|---|---|
| RANGE SENSOR USED | ⋮ |
| DEPTH SENSOR USED | ⋮ |
| ILLUMINOMETER AND ULTRASONIC RANGE SENSOR USED | ⋮ |

| LINE NAME | PROCESS | FACILITY | USE | |
|---|---|---|---|---|
| aaa PRODUC- TION LINE | aa1 PROCESS | aa1x | aa1 PROCESS START TIME | |
| | | | aa1 PROCESS END TIME | |
| | | | ⋯ | |
| | | aa1y | BBB | |
| | | | ⋯ | |
| | aa2 PROCESS | aa2x | CCC | |
| | | | ⋯ | |
| | ⋯ | ⋯ | ⋯ | |
| ⋯ | ⋯ | ⋯ | ⋯ | |

Figure 17:
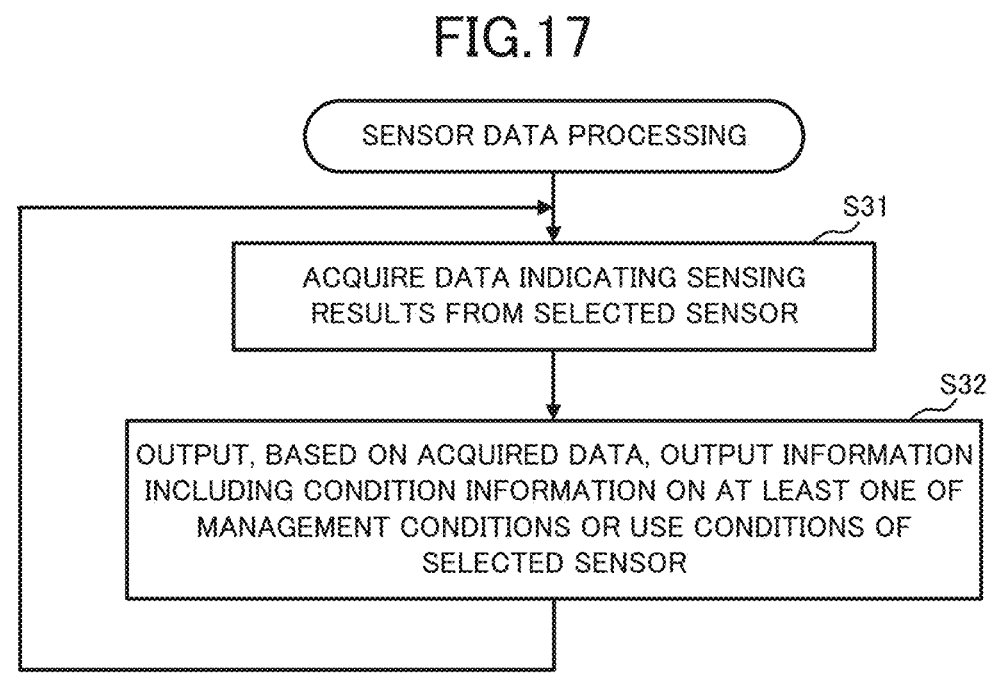

```
          ┌──────────────────────────────────┐
          │      SENSOR DATA PROCESSING       │
          └──────────────────────────────────┘
                           │
                           ▼                        S31
          ┌──────────────────────────────────────┐
          │   ACQUIRE DATA INDICATING SENSING     │
          │    RESULTS FROM SELECTED SENSOR       │
          └──────────────────────────────────────┘
                           │
                           ▼                        S32
          ┌──────────────────────────────────────┐
          │ OUTPUT, BASED ON ACQUIRED DATA, OUTPUT INFORMATION │
          │ INCLUDING CONDITION INFORMATION ON AT LEAST ONE OF │
          │  MANAGEMENT CONDITIONS OR USE CONDITIONS OF        │
          │            SELECTED SENSOR                         │
          └──────────────────────────────────────┘
```

FIG.19

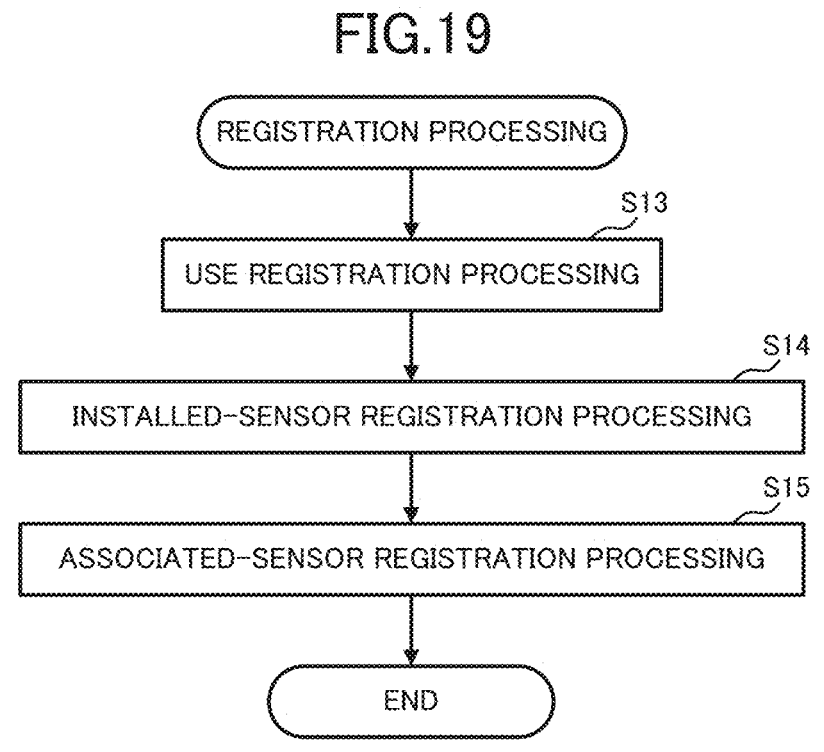

```
        ┌─────────────────────────────┐
        │  REGISTRATION PROCESSING    │
        └─────────────────────────────┘
                      │
                      ▼                    S13
        ┌─────────────────────────────┐
        │  USE REGISTRATION PROCESSING│
        └─────────────────────────────┘
                      │
                      ▼                         S14
   ┌───────────────────────────────────────────┐
   │  INSTALLED-SENSOR REGISTRATION PROCESSING  │
   └───────────────────────────────────────────┘
                      │
                      ▼                         S15
   ┌───────────────────────────────────────────┐
   │ ASSOCIATED-SENSOR REGISTRATION PROCESSING  │
   └───────────────────────────────────────────┘
                      │
                      ▼
                ┌───────────┐
                │    END    │
                └───────────┘
```

LINE MANAGEMENT ASSISTANCE DEVICE, LINE MANAGEMENT ASSISTING METHOD, AND RECORDING MEDIUM

CROSS-REFERENCE TO RELATED APPLICATION

The present application is based on PCT filing PCT/JP2021/022741, filed Jun. 15, 2021, the entire contents of which are incorporated herein by reference.

TECHNICAL FIELD

The present disclosure relates to a line management assistance device, a line management assisting method, and a program.

BACKGROUND ART

A factory automation (FA) site usually involves operations of various lines including a production line, an inspection line, and a machining line. These lines can be monitored and managed using sensors installed on the lines (see, for example, Patent Literature 1).

Patent Literature 1 describes a management system for detecting events based on state information indicating the progress of processes included in a manufacturing line and acquired from sensors that detect arrival or discharge of workpieces to and from each process. When one of images including manufacturing lines displayed on a user interface screen is selected, the management system displays a log of events that have occurred in the process as information on one or more processes included in the selected manufacturing line. Thus, data acquired from each sensor is hierarchically managed in association with the process involving the sensor and the line including the process.

CITATION LIST

Patent Literature

Patent Literature 1: Unexamined Japanese Patent Application Publication No. 2017-102668

SUMMARY OF INVENTION

Technical Problem

To improve line operations, a new sensor may be selected and used for line management. For example, users may intend to monitor the time to start one process included in the operations performed in the line using a sensor in the same manner as in another process. However, users usually fail to acquire information intended for line management directly from a sensor. The results sensed by the sensor are to be processed into information useful to users in the same manner as in the management system in Patent Literature 1. Selecting a sensor based on user requests for intended line management involves expertise of skilled users. Using an inappropriate sensor may lower the efficiency of line management.

In response to the above issue, an objective of the present disclosure is to improve the efficiency of line management using sensors.

Solution to Problem

To achieve the above objective, a line management assistance device according to an aspect of the present disclosure is a line management assistance device connectable to at least two sensors installed on a line. The line management assistance device includes reception means for receiving a management condition specified as a condition for managing the line, and display means for displaying assistance information indicating a list of candidates for a sensor to be used to manage the line. The candidates are one or more sensors preassociated with a use condition of preregistered use conditions for the at least two sensors. The use condition has a degree of similarity to the management condition exceeding a threshold.

Advantageous Effects of Invention

The present disclosure can improve the efficiency of line management using sensors.

BRIEF DESCRIPTION OF DRAWINGS

FIG. 5 is a diagram of an example line registration screen in Embodiment 1;

FIG. 6 is a diagram of an example process registration screen in Embodiment 1;

FIG. 7 is a diagram of an example use registration screen in Embodiment 1;

FIG. 8 is a diagram illustrating the relationship between line information, process information, and use information in Embodiment 1;

FIG. 9 is a diagram of an example sensor registration screen in Embodiment 1;

FIG. 10 is a diagram of an example sensor-group registration screen in Embodiment 1;

FIG. 14 is a diagram illustrating the relationship between line information, process information, use information, installed-sensor information, and associated-sensor information in Embodiment 1;

FIG. 17 is a flowchart of sensor data processing in Embodiment 1;

FIG. 19 is a flowchart of registration processing in Embodiment 2;

DESCRIPTION OF EMBODIMENTS

A line management assistance device 100 according to an embodiment of the present disclosure is described below in detail with reference to the drawings.

Embodiment 1

Figure 1:
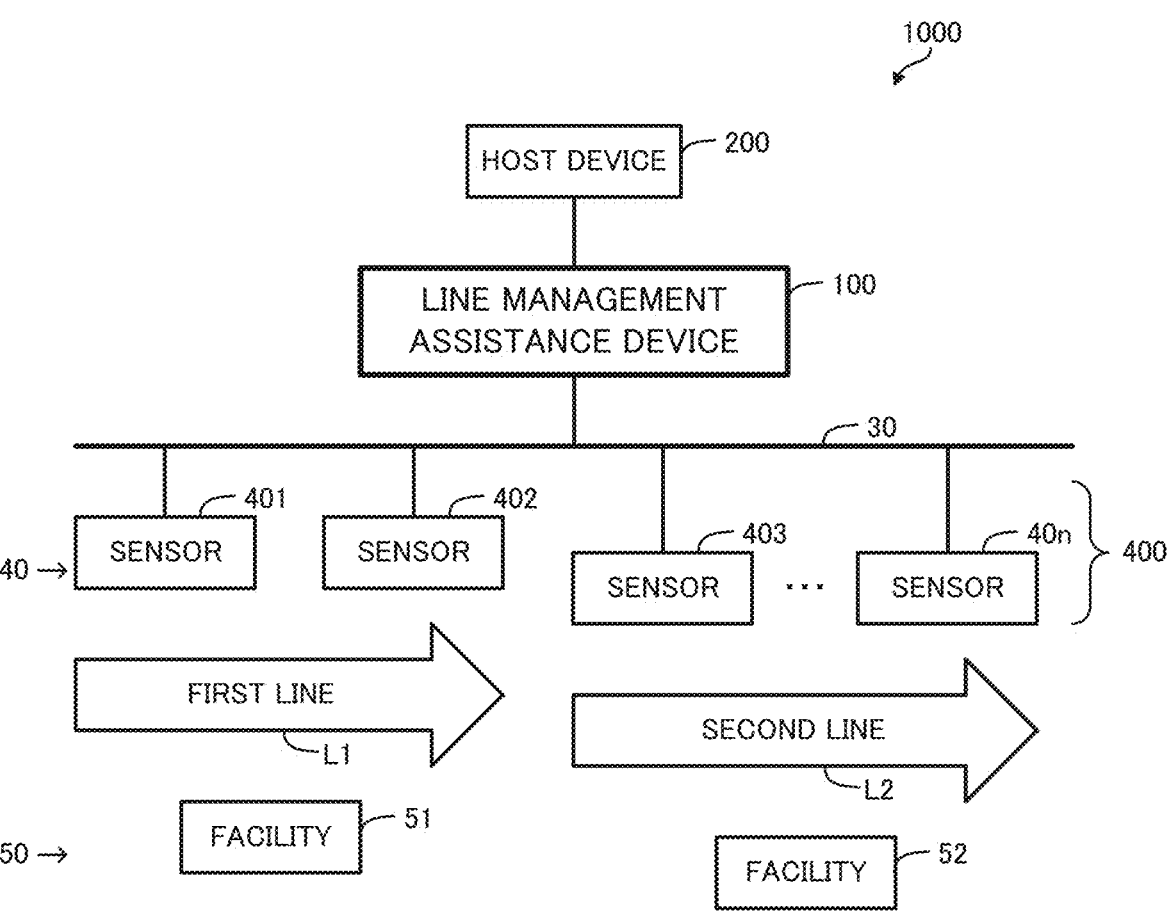
FIG. 1 is a diagram of a management system according to Embodiment 1.

The line management assistance device 100 according to the present embodiment assists a user in selecting sensors for line management. As illustrated in FIG. 1, the line management assistance device 100 is connected to a host device 200 with a transmission line, and connected to two or more sensors 401, 402, 403, and 40n with a network 30. Hereafter, each of the sensors 401, 402, 403, and 40n is referred to as a sensor 40 without distinction, and a group including all the sensors 40 is referred to as a sensor group 400.

The transmission line connecting the line management assistance device 100 and the host device 200 to each other may be a communication line such as a universal serial bus (USB) cable, or part of the network 30. The network 30 may be an industrial network such as a field bus network or an information network such as a local area network (LAN).

For example, each of the sensors 40 is a data acquisition device such as a barcode reader, a range sensor, a passage detector, a depth sensor, an illuminometer, or a face authentication device, and installed on a corresponding line. More specifically, the sensors 401 and 402 are installed on a facility 51 in a first line L1, and the sensors 403 to 40n are installed on a facility 52 in a second line L2. The sensors 40 may output sensing results in predetermined cycles, or transmit signals as sensing results when a specific event occurs.

Each of the first line L1 and the second line L2 is a production line, an inspection line, or another line for performing predetermined processing on a process target. The facilities 51 and 52 are components included in the lines other than the sensors 40 and the process targets, or for example, a belt conveyor, a member for supporting the belt conveyor, or an FA device that performs processing on workpieces conveyed by the belt conveyor. Examples of the FA device include an actuator and a robot.

FIG. 1 simply illustrates a single facility 51 in the first line L1 and a single facility 52 in the second line L2, but each of the first line L1 and the second line L2 may include multiple facilities 51 or 52. Each of the facilities 51 and 52 is hereafter referred to as a facility 50 without distinction. Normally, a line includes a large number of facilities 50.

The line management assistance device 100 is, for example, a programmable logic controller (PLC), an industrial personal computer (IPC), or another information processor, and is included in a management system 1000 used by a user for line management together with the host device 200, the sensor group 400, and the facilities 50. In the management system 1000, the line management assistance device 100 acquires, from the sensor group 400, data indicating sensing results of the line operating state acquired by each sensor 40, and transmits the acquired data to the host device 200.

The host device 200 is an IPC, and analyzes the line operating state based on data acquired from the line management assistance device 100 using a business intelligence (BI) tool, and provides the analysis result to the user. The analysis of the host device 200 is, for example, detection of abnormality or real-time calculation of an index value such as the yield, the turnover ratio, or the efficiency percentage.

Efficient analysis of the host device 200 involves clear data attributes or metadata. Thus, the line management assistance device 100 associates metadata with the data acquired from the sensor group 400, and transmits the data to the host device 200. The data attributes indicate, for example, an identifier of the sensor 40 that outputs the data, the type of data, or the intended use of the data or the analysis for which the data is to be used.

Figure 2:
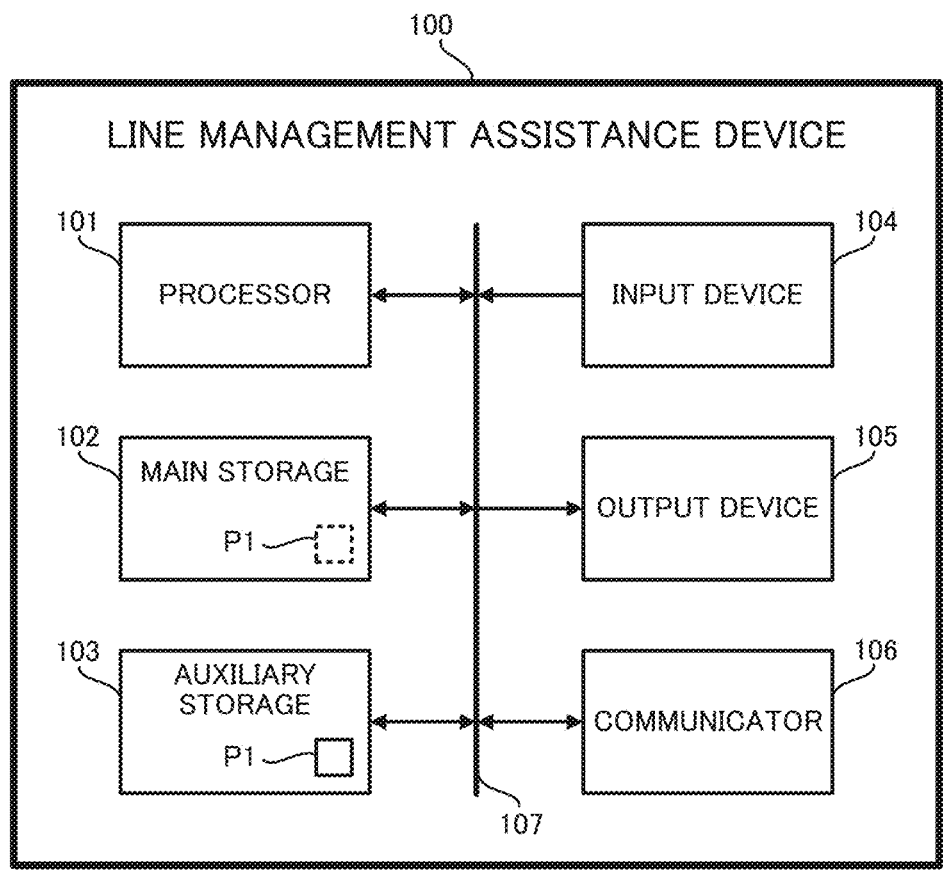
FIG. 2 is a diagram of a line management assistance device according to Embodiment 1, illustrating the hardware configuration.

FIG. 2 is a diagram of the line management assistance device 100, illustrating the hardware configuration. As illustrated in FIG. 2, the line management assistance device 100 includes a processor 101, a main storage 102, an auxiliary storage 103, an input device 104, an output device 105, and a communicator 106. The main storage 102, the auxiliary storage 103, the input device 104, the output device 105, and the communicator 106 are connected to the processor 101 with an internal bus 107.

The processor 101 includes a central processing unit (CPU) or a microprocessing unit (MPU) being an integrated circuit. The processor 101 executes a program P1 stored in the auxiliary storage 103 to implement the functions described later.

The main storage 102 includes a random-access memory (RAM). The program P1 is loaded into the main storage 102 from the auxiliary storage 103. The main storage 102 is used as a work area for the processor 101.

The auxiliary storage 103 includes a nonvolatile memory such as an electrically erasable programmable read-only memory (EEPROM). In addition to the program P1, the auxiliary storage 103 stores various types of data used in processing performed by the processor 101. In accordance with instructions from the processor 101, the auxiliary storage 103 provides, to the processor 101, data to be used by the processor 101, and stores data provided from the processor 101.

The input device 104 includes, for example, an input key or a dual in-line package switch. The input device 104 acquires information input by the user of the line management assistance device 100, and notifies the processor 101 of acquired information.

The output device 105 includes a light emitting diode (LED) or a liquid crystal display (LCD). The output device 105 provides various types of information to the user in accordance with the instructions from the processor 101.

The communicator 106 includes a network interface circuit for communicating with external devices. The communicator 106 receives signals from the external devices, and notifies the processor 101 of information indicated by these signals. The communicator 106 transmits signals indicating information output from the processor 101 to the external devices.

Figure 3:
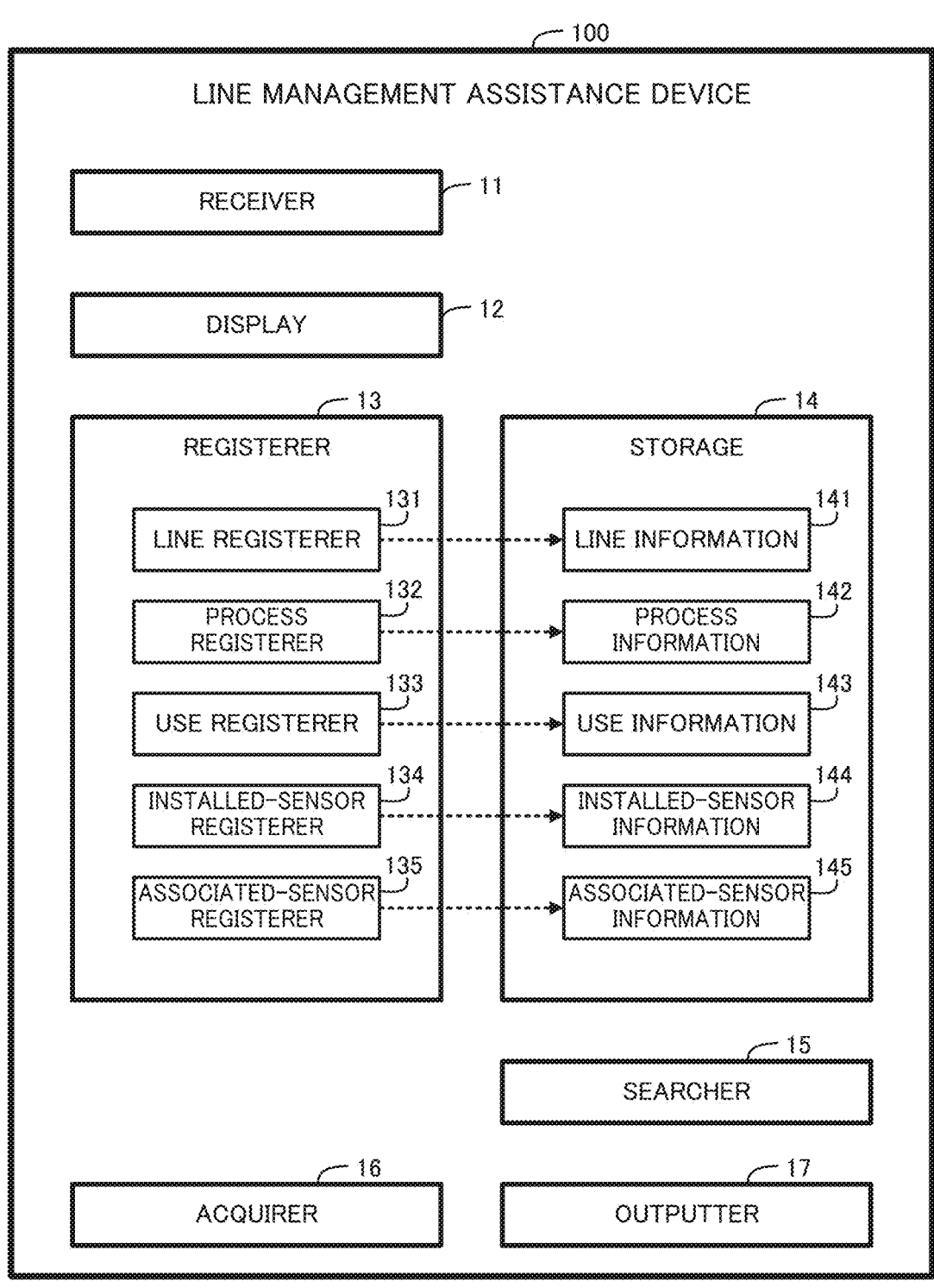
FIG. 3 is a functional block diagram of the line management assistance device according to Embodiment 1.

Through cooperation of the above hardware, as illustrated in FIG. 3, the line management assistance device 100 includes, as the functional components, a receiver 11 and a display 12 as user interfaces, a registerer 13 that registers information with the line management assistance device 100, a storage 14 that stores various types of information, a searcher 15 that searches for information registered at the storage 14 for specific information, an acquirer 16 that acquires data from the sensor group 400, and an outputter 17 that outputs information including metadata based on data from each sensor 40 to the host device 200.

The receiver 11 is mainly implemented by the input device 104. Instead, when the line management assistance device 100 acquires information input by the user operating the host device 200 through the transmission line, the receiver 11 may be implemented by the communicator 106 that communicates with the host device 200. The display 12 is mainly implemented by the output device 105. Instead, when the line management assistance device 100 provides information to the user from the host device 200 through the transmission line, the display 12 may be implemented by the communicator 106 that communicates with the host device 200.

The registerer 13 is mainly implemented by the processor 101. The registerer 13 includes a line registerer 131 for registering a line, a process registerer 132 for registering a process included in the line, a use registerer 133 for registering the intended use of data from each sensor 40, an installed-sensor registerer 134 for registering each sensor 40 installed in the line, and an associated-sensor registerer 135 for registering the sensor 40 that outputs data satisfying the use in association with the use. The line registerer 131, the process registerer 132, the use registerer 133, the installed-sensor registerer 134, and the associated-sensor registerer 135 provide, to the display 12, information for prompting the user to input information, and store, into the storage 14, information based on the inputs from the user received by the receiver 11. Information registration performed by the registerer 13 is described in detail later.

The storage 14 is mainly implemented by the auxiliary storage 103. The storage 14 stores line information 141 indicating a line registered by the line registerer 131, process information 142 indicating the process registered by the process registerer 132, use information 143 indicating the use registered by the use registerer 133, installed-sensor information 144 indicating the sensor 40 registered by the installed-sensor registerer 134, and associated-sensor information 145 indicating the correspondence between the use and the sensor 40 registered by the associated-sensor registerer 135. The searcher 15 is mainly implemented by the processor 101. The searcher 15 searches the storage 14 for the sensor 40 corresponding to use conditions similar to management conditions received by the receiver 11, and provides the search results to the display 12. The management conditions and the use conditions are described in detail later.

The acquirer 16 is mainly implemented by the communicator 106. The acquirer 16 acquires data indicating sensing results from the sensor 40 selected by the user from the search results of the searcher 15, and outputs the acquired data to the outputter 17.

The outputter 17 is mainly implemented by the processor 101 and the communicator 106 operating in cooperation with each other. The outputter 17 generates information including metadata based on data from the sensor 40, and transmits the information to the host device 200. Information output from the outputter 17 is used by the host device 200 for line management.

The processing performed by the line management assistance device 100 is described with reference to FIGS. 4 to 18.

Figure 4:
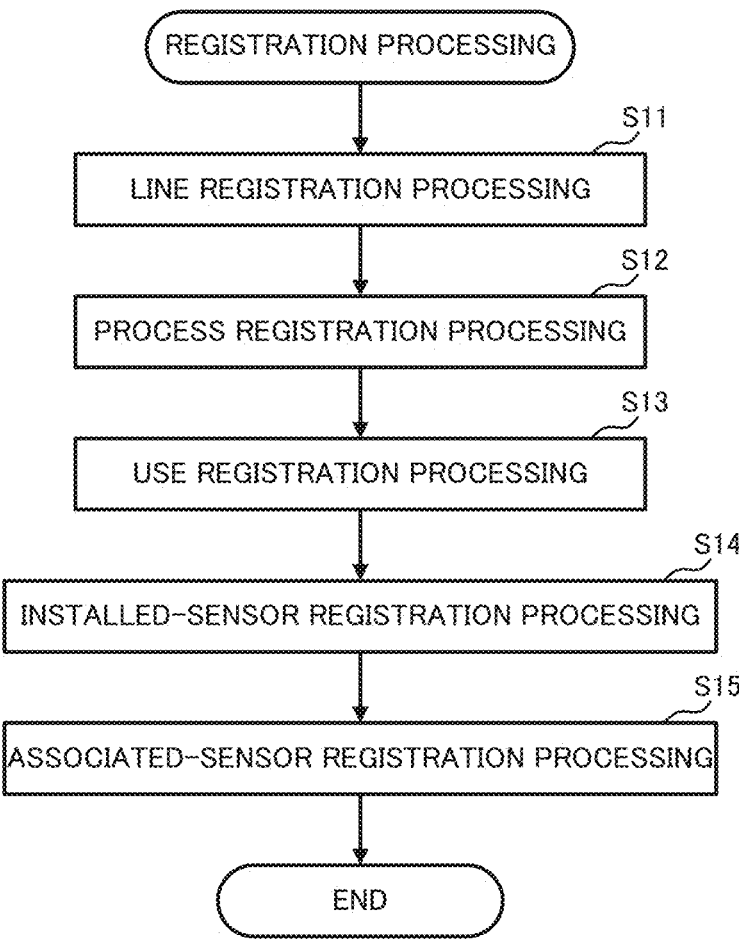
FIG. 4 is a flowchart of registration processing in Embodiment 1.

FIG. 4 illustrates registration processing for registering various types of information in the line management assistance device 100 with the user's operation. For example, the user activating a specific application starts the registration processing illustrated in FIG. 4.

In the registration processing, the line registerer 131 performs line registration processing for defining the attributes of each line (step S11). More specifically, in response to an instruction from the line registerer 131, the display 12 displays a line registration screen as illustrated in FIG. 5. The user inputs, through the line registration screen, a line name of each line to be managed as an identifier for identifying the line, a process target in the line, the line function or the processing mainly performed at the line, other characteristic attributes of the line, and a visual image indicating the outline of the line.

The process target is, for example, a product, a target to be machined, a target to be inspected, or a workpiece. The line function is, for example, machining, assembly, or coating. In the example in FIG. 5, the line named aaa production line is provided for assembly of products with product no. aaa123. Each input from the user may be an indication of a character string through a keyboard, a selection performed by the user from predetermined options in a pull-down list, or an information item read from the storage area specified by the user.

Information defining the line attributes input by the user is received by the receiver 11, and then stored into the storage 14 by the line registerer 131 as the line information 141.

Subsequently, the process registerer 132 performs the process registration processing for defining the attributes of one or more processes included in each line (step S12). More specifically, the display 12 displays a process registration screen as illustrated in FIG. 6 in response to an instruction from the process registerer 132 for each of the lines registered in step S11. The user inputs, for each process, a process name as an identifier for identifying the process, and a name of the facility used in the process through the process registration screen. In the example in FIG. 6, aaa production line illustrated in FIG. 5 sequentially involves aa1 process involving the use of facilities aa1$x$ and aa1$y$, aa2 process involving the use of a facility aa2$x$, and aa3 process involving the use of facilities aa3$x$ and aa3$y$. Information defining the attributes of the process input by the user is received by the receiver 11, and stored into the storage 14 by the process registerer 132 as the process information 142.

Subsequently, the use registerer 133 performs use registration processing to allow the user to define the intended use of data from the sensor 40 in association with the line, the process, and the facility (step S13). More specifically, the display 12 displays the use registration screen illustrated in FIG. 7 for the line, the process, and the facility registered in steps S11 and S12 in response to an instruction from the use registerer 133. The user inputs a character string indicating the use and remarks on the use through the use registration screen.

In the example in FIG. 7, the uses including aa1 process start time, aa1 process end time, lot start time, lot end time, in-operation, and non-operation are input for aa1 process using the facility aa1$x$ in aaa production line. These uses are information intended to be acquired by the user through any of the sensors 40, and corresponding to the analyses performed by the host device 200. Information defining the uses input by the user is received by the receiver 11, and then stored into the storage 14 by the use registerer 133 as the use information 143.

As illustrated in FIG. 8, the line information 141, the process information 142, and the use information 143 are registered with the storage 14 in association with each other through steps S11 to S13. In the example in FIG. 8, part of information is not illustrated. For example, the process target and the function of the line included in the line information 141 are not illustrated, although the process target and the function of the line may be also stored in association with the line name in FIG. 8.

Subsequently, the installed-sensor registerer 134 performs installed-sensor registration processing for registering the sensor 40 installed on each line (step S14). More specifically, in response to an instruction from the installed-sensor registerer 134, the display 12 displays the sensor registration screen and the sensor-group registration screen as illustrated in FIGS. 9 and 10.

As illustrated in FIG. 9, the user inputs the sensor name of each sensor 40 as an identifier for identifying the sensor 40, the type of the sensor 40, and the manufacturer name or the model number of the sensor 40 through the sensor registration screen. In the example in FIG. 9, the name of the sensor 40 classified into an ultrasonic range sensor is registered as a range sensor 1.

Figure 11:
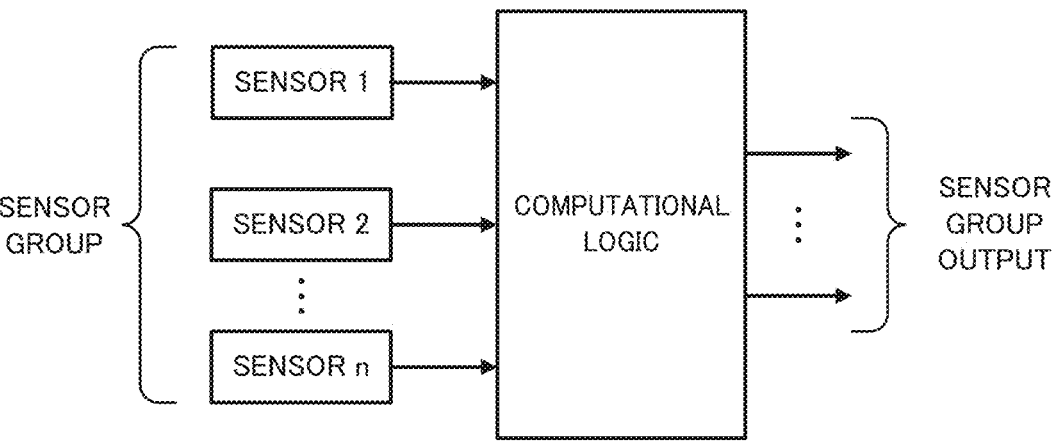
FIG. 11 is a diagram illustrating a computational logic in Embodiment 1.

As illustrated in FIG. 10, through the sensor-group registration screen, the user inputs a sensor group name for each sensor group as an identifier for identifying the sensor group including multiple sensors 40, the sensor names of the sensors 40 included in the sensor group, the setting conditions, and the computational logic indicating the operation performed on the sensor group. The setting conditions are, for example, parameters for setting the distance between the sensors 40, the detection sensitivity of each sensor 40, or the sensing cycle of each sensor 40. In the example in FIG. 10, a sensor group z includes the range sensor 1, a range sensor 2, and an illuminometer. As illustrated in FIG. 11, the computational logic indicates a predetermined operation performed on multiple sets of data output from the sensors 40 included in the sensor group to acquire intended outputs. The computational logic may be, for example, a combination of logical operations such as the OR operation and the AND operation, an operation or statistical treatment performed on chronological data such as the moving average, an addition of predetermined correction values, or an addition of or a subtraction between sensing results.

When a small number of range sensors are used to detect the production states of products on the production line, the range sensors may fail to detect the states due to the shadow of the operator or inappropriate detection timing. To avoid such detection failure, multiple range sensors may be placed at different positions in the direction of the production line. The multiple range sensors may transmit overlapping data sets indicating the detection of the same product to the line management assistance device 100. Thus, an effective computational logic eliminates a data set overlapping another data set in the data transmitted from the multiple range sensors based on the speed of products transported on the production line, the distance between the range sensors, and the time when the data sets are acquired.

Instead, a sensor group may be registered through the sensor-group registration screen to simply allow the user to easily manage a group of sensors 40 without setting a computational logic.

Information defining the sensors 40 and the sensor groups input by the user through the sensor registration screen and the sensor-group registration screen is received by the receiver 11, and stored into the storage 14 by the installed-sensor registerer 134 as the installed-sensor information

Figure 12:
FIG. 12 is a diagram of example installed-sensor information in Embodiment 1.

144. The installed-sensor information 144 is information defining the registered sensors 40 and the sensor groups as illustrated in FIG. 12. The sensors 40 hereafter refer to sensors including the sensor groups defined by the installed-sensor information 144.

Figure 13:
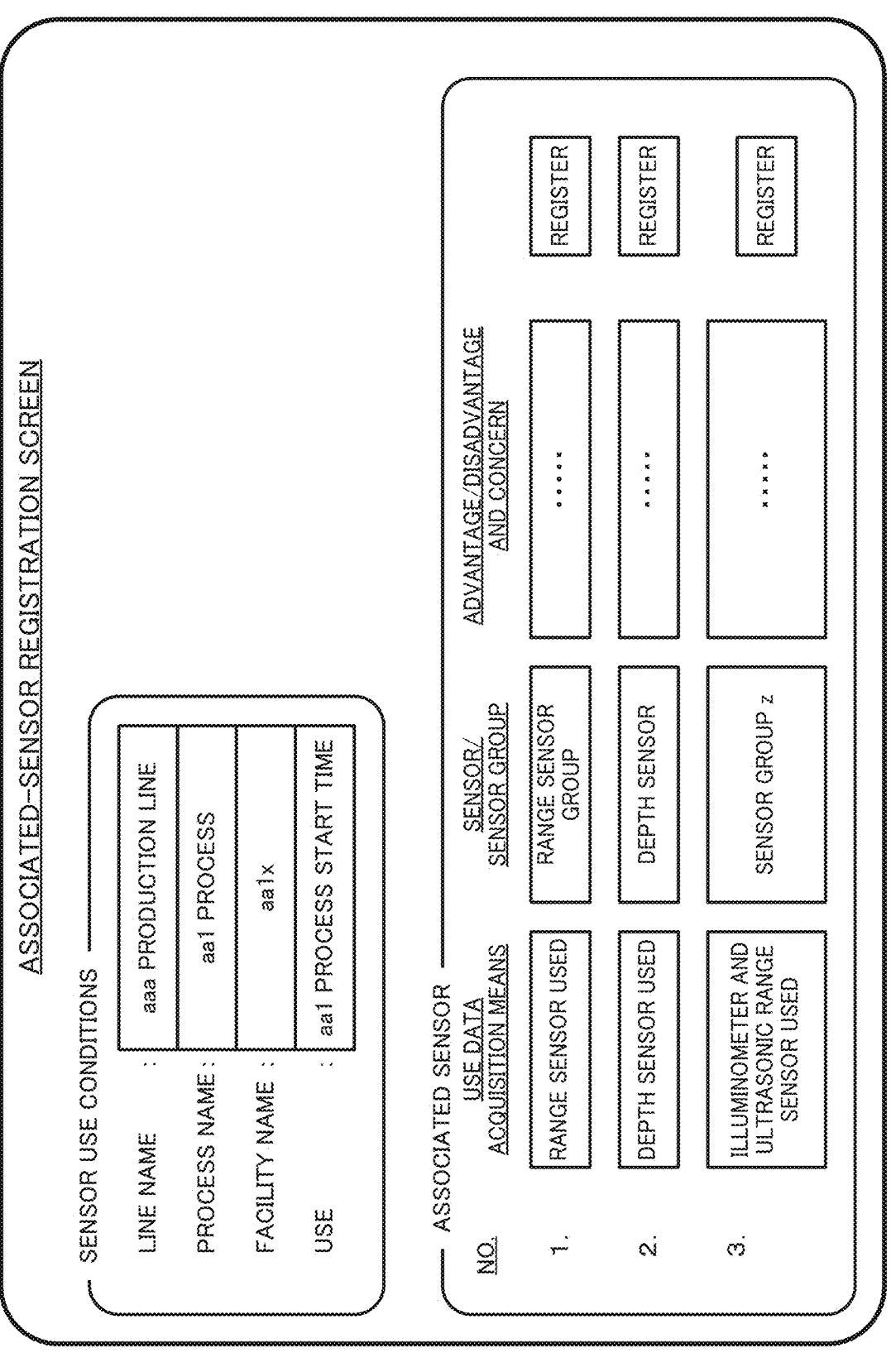
FIG. 13 is a diagram of an example associated-sensor registration screen in Embodiment 1.

Referring back to FIG. 4, subsequent to step S14, the associated-sensor registerer 135 performs associated-sensor registration processing for associating the sensor 40 registered in step S14 with information registered in steps S11 to S13 (step S15). More specifically, the display 12 displays an associated-sensor registration screen including, as illustrated in FIG. 13, an entry field for specifying the use conditions of the sensor 40 based on information registered in steps S11 to S13 and an entry field for specifying the associated one of the sensors 40 registered in step S14 associated with the use conditions. The user inputs the use conditions including the line, the process, the facility, and the use into the entry fields for the use conditions in the associated-sensor registration screen. In the example in FIG. 13, the line name, the process name, the facility name, and the use are input as the use conditions.

The user inputs, in the entry fields for the associated sensor in the associated-sensor registration screen, use data acquisition means, the sensor 40 satisfying the use conditions, as well as the advantage, disadvantage, and concern in association with each other. The use data acquisition means acquires data satisfying the use, and is used as an identifier for identifying the sensor 40 satisfying the use conditions. In the example in FIG. 13, labels indicating the use of a range sensor, the use of a depth sensor, and the use of both an illuminometer and an ultrasonic range sensor are input as the use data acquisition means.

The entry field for the sensor or sensor group receives input of the sensor 40 determined by the user as being suitable for achieving the use in relation to the line, the process, and the facility input into the sensor use conditions. The advantage, disadvantage, and concern input into the entry field indicates the advantage, disadvantage, and concern in using the sensor 40 input by the user in relation to the use conditions. For example, noise elimination or detection failure reduction with an appropriate combination of sensors is registered as the advantage, disadvantage, and concern. FIG. 13 illustrates inputs of three patterns of a sensor(s) 40 satisfying the use condition of determining aa1 process start time of the facility aa1$x$ installed at aa1 process in aaa production line. When the user selects a register button in the screen, the inputs are received by the receiver 11, and stored into the storage 14 by the associated-sensor registerer 135 as the associated-sensor information 145.

FIG. 14 illustrates the relationship between the line information 141, the process information 142, the use information 143, the installed-sensor information 144, and the associated-sensor information 145. As indicated with the lines in FIG. 14, the associated-sensor information 145 defines the correspondence between the items of the line information 141, the process information 142, and the use information 143, and the items of the installed-sensor information 144.

Instead of the associated-sensor registerer 135, the installed-sensor registerer 134 may register the information on the advantage, disadvantage, and concern in association with the sensor 40.

Referring back to FIG. 4, when step S15 ends, the registration processing ends. The registration processing in steps S11 to S15 registers information used in the selection processing to allow the user to select a sensor satisfying the request with the storage 14.

Figure 15:
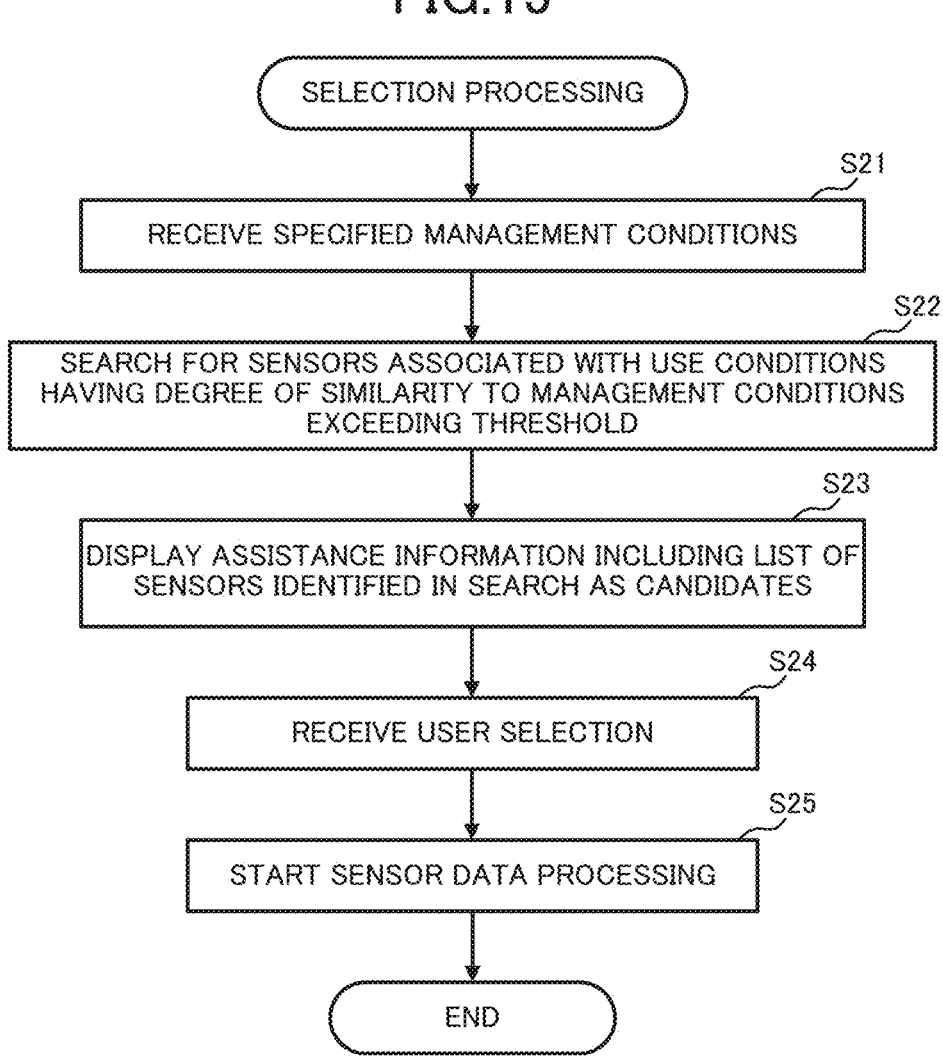
FIG. 15 is a flowchart of selection processing in Embodiment 1.
Figure 16:
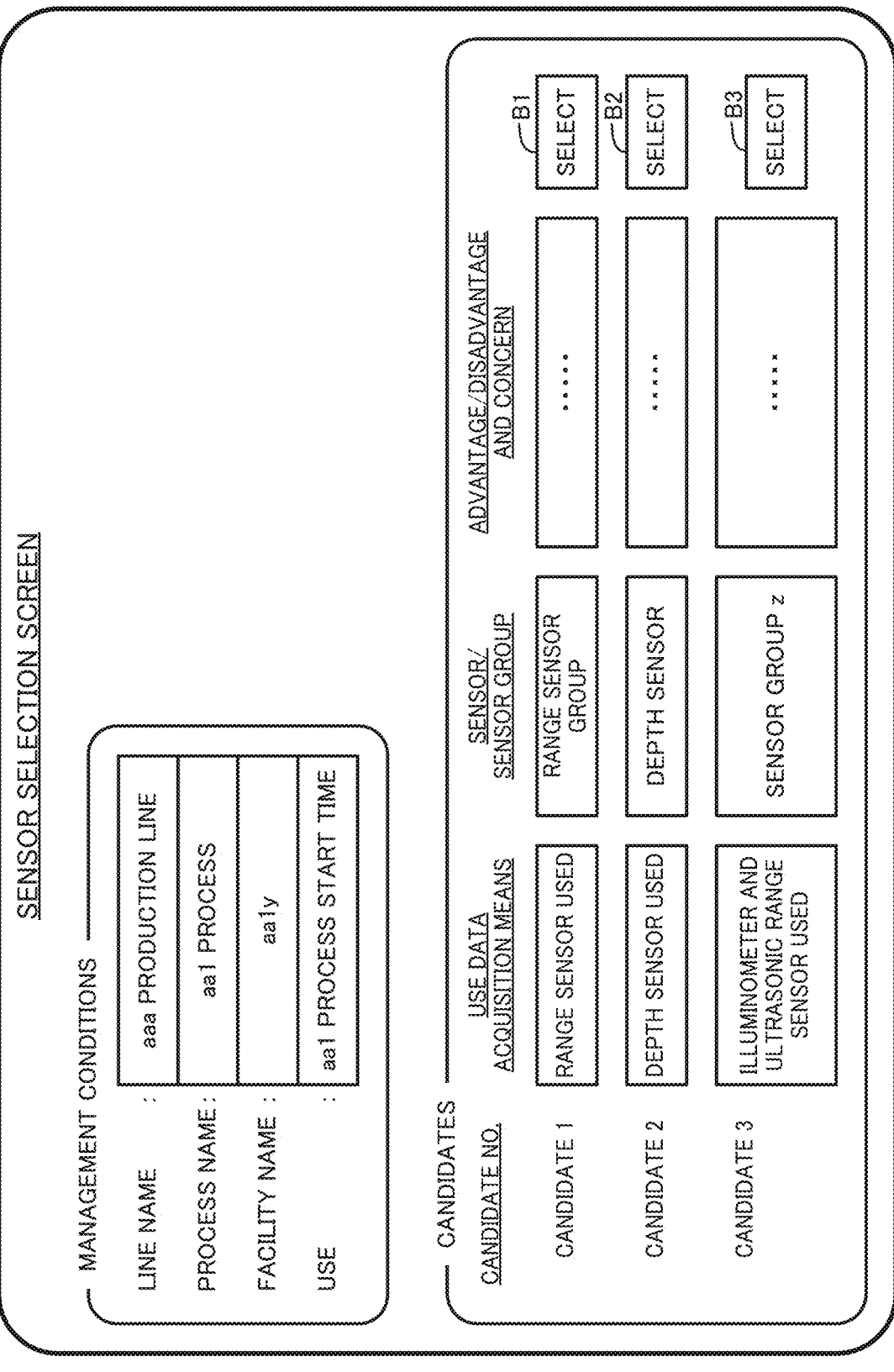
FIG. 16 is a diagram of an example sensor selection screen in Embodiment 1.

The selection processing is started by, for example, activating a specific application. As illustrated in FIG. 15, in the selection processing, the receiver 11 receives management conditions specified for line management (step S21). More specifically, the display 12 displays a sensor selection screen including entry fields for the management conditions as illustrated in FIG. 16 to prompt the user to input management conditions. The management conditions correspond to user requests input by specifying the line, the process, and the facility and specifying the intended use of the data from the sensor 40. More specifically, the management conditions are input in the same form as the use conditions illustrated in FIG. 13, and include the intended use of the sensor. In the line management assistance device 100, the receiver 11 corresponds to example reception means for receiving management conditions specified as the conditions for line management.

Subsequently, the searcher 15 searches the storage 14 for the sensor 40 associated with the use conditions having a degree of similarity to the specified management conditions exceeding a threshold (step S22). More specifically, each of the items matching the items in the management conditions is counted as one point, and the searcher 15 searches the storage 14 for the use conditions with the items summing up to over a predetermined threshold. For example, the line name, the process name, and the use in the management conditions illustrated in FIG. 16 match the items in the use conditions illustrated in FIG. 13, and thus the sum of the points for the sensor 40 associated with the use conditions is three points. When the threshold is two points and the management conditions illustrated in FIG. 16 are input, the management conditions match the use conditions illustrated in FIG. 13, and the associated sensor associated with the use conditions is output as a search result.

The items included in the management conditions and the use conditions are not limited to the items illustrated in FIGS. 13 and 16, and may include, for example, the line function illustrated in FIG. 5. Instead of one point, the items may be differently weighted in advance to have different points. The searcher 15 may search for a predetermined number of use conditions in order from the highest total points in the degree of similarity. To conclude that none of the use conditions match the management conditions when all the use conditions have low total points, the searcher 15 may search for use conditions with points higher than the threshold. The use conditions that match the management conditions are identified as the use conditions with the highest degree of similarity in the search of the searcher 15.

The display 12 displays assistance information including a list of the sensors 40 identified in the search in step S22 as candidates (step S23). More specifically, as illustrated in FIG. 16, the display 12 displays the use data acquisition means, the sensor or sensor group, and the advantage, disadvantage, and concern associated with the identified use conditions in a table. In this case, the user can select the sensor or sensor group using the advantage, disadvantage, and concern as a criterion. In the line management assistance device 100, the display 12 corresponds to example display means for displaying assistance information indicating, as candidates for a sensor to be used for line management, a list of one or more sensors preassociated with a use condition, of preregistered use conditions, having a degree of similarity to the management conditions exceeding a threshold.

Subsequently, the receiver 11 receives a user selection from the list (step S24). More specifically, when the user presses, clicks, or taps any of selection buttons B1, B2, and B3 for selecting one candidate illustrated in FIG. 16, the receiver 11 receives a selection of a candidate corresponding to the button pressed or subjected to other operations. Thus, the use of the selected candidate sensor 40 is set for the input management conditions.

The line management assistance device 100 then starts sensor data processing (step S25), and ends the selection processing. The input management conditions and the candidate selected in the selection processing may be registered with the storage 14 as new use conditions and the sensor 40 corresponding to the use conditions. When a combination of the management conditions and the candidate is registered as a combination of new use conditions and the sensor 40, information indicating that the selection performed by the user may be associated to facilitate association of metadata in the sensor data processing (described later).

The sensor data processing includes processing of data actually output from the sensor 40 and transmission of the processed data to the host device 200. The sensor data processing is started by activating a specific application.

As illustrated in FIG. 17, in the sensor data processing, the acquirer 16 acquires data indicating sensing results from the sensor 40 selected in the selection processing (step S31). For example, when the selection button B3 is pressed or subjected to other operations in the screen in FIG. 16, the acquirer 16 receives data sets from the sensors 40 included in the sensor group z. As illustrated in FIG. 12, the sensor group z includes the range sensor 1, the range sensor 2, and the illuminometer. Thus, the acquirer 16 acquires data from these sensors 40. In the line management assistance device 100, the acquirer 16 corresponds to example acquisition means for acquiring data output from one or more sensors being the candidates selected from the list.

Figure 18:
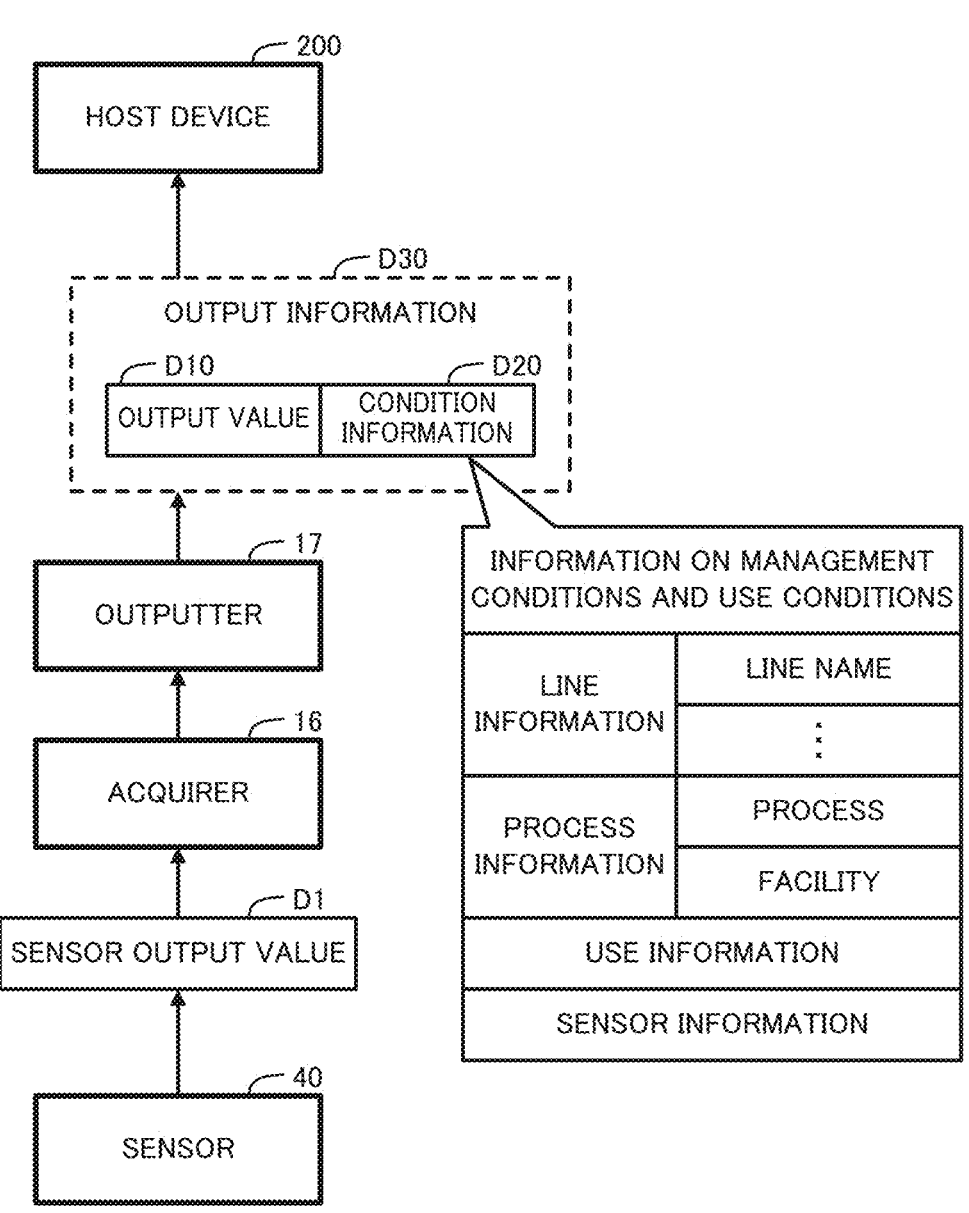
FIG. 18 is a diagram illustrating output information in Embodiment 1.

Subsequently, the outputter 17 outputs, based on the data acquired in step S31, output information including condition information on at least one of the management conditions or the use conditions of the selected sensor 40 (step S32). More specifically, as illustrated in FIG. 18, the outputter 17 acquires a sensor output value D1 output from the sensor 40 from the acquirer 16, and outputs, to the host device 200, output information D30 including an output value D10 equivalent to the sensor output value D1 associated with condition information D20 as metadata.

The condition information indicates at least one or all of the items included in the use conditions and the management conditions. For example, the condition information D20 illustrated in FIG. 18 includes information indicating the line, the process, the facility, and the use included in the management conditions, and information indicating the sensor 40 as a selected candidate. Instead, the condition information may exclude part of the information. More specifically, the condition information D20 may include at least one of information on the line, information on the process included in the line, information on the selected one or more sensors being the candidates, or information indicating the intended use of the sensors. When the user registers the use conditions in the registration processing, simply selecting the sensor 20 in the selection processing associates the condition information indicating the use conditions or the management conditions similar to the use conditions with the output value D10 as metadata. Thus, the user can save time and effort of creating metadata, and the line management assistance device 100 improves line management efficiency. The registerer 13 corresponds to example register means for registering use conditions.

When a computational logic is set for a sensor group, the outputter 17 associates the condition information D20 with the output value D10 indicating the result acquired by performing the computational logic on the sensor output value D1, and outputs the resultant. In the line management assistance device 100, the outputter 17 corresponds to example output means for outputting, based on the data acquired by the acquisition means, output information including the condition information on at least one of the management conditions or the use conditions associated with the selected one or more sensors being the candidates. Upon completion of the processing in step S32, the line management assistance device 100 repeats the processing in step S31 and subsequent steps.

As described above, in the line management assistance device 100 according to the present embodiment, the registerer 13 registers the line information 141, the process information 142, the use information 143, the installed-sensor information 144, and the associated-sensor information 145 with the storage 14. Thus, the line management assistance device 100 organizes and manages sensor information including the arrangement of the sensors 40 in multiple lines, and the correspondence between the intended use of data and the sensors 40 used for the intended use. Thus, the line management assistance device 100 can accumulate expertise and knowledge for acquiring data appropriate for the use intended by the user from the sensors 40 into the storage 14, and update the expertise and knowledge as appropriate.

The display 12 displays assistance information indicating a list of the sensors 40 associated with the conditions similar to the user request as candidates for the sensors 40 used for achieving the user request. The outputter 17 outputs output information acquired by associating information on the request with data output from each sensor 40 or a resultant acquired by performing an operation on the data. Thus, after the registration processing ends, a simple operation of the user inputting a request and selecting any of the candidates in the list provides output information including metadata to the host device 200. Thus, the line management assistance device 100 improves line management efficiency using sensors.

For ease of understanding, the registration processing, the selection processing, and the sensor data processing are performed in this order in the above example, but may be performed differently. For example, the registration processing may be performed during the selection processing, or the registration processing may be performed while the sensor data processing is repeated. More specifically, in the selection processing, when the user checks assistance information displayed upon inputs of the management conditions, and identifies a sensor more suitable for the management conditions than the candidates included in the assistance information, the user may register information to associate such a sensor with the use conditions equivalent to the input management conditions.

Embodiment 2

Embodiment 2 is now described focusing on the difference from Embodiment 1. The same reference signs denote the same or equivalent components as in Embodiment 1. Embodiment 2 differs from Embodiment 1 in that the procedure (including a combination of procedures) for acquiring a series of data items including use registration, installed-sensor registration, and associated-sensor registration is determined as the use of acquiring data (intention of data acquisition), and is used as metadata for identifying the acquired data.

Figure 20:
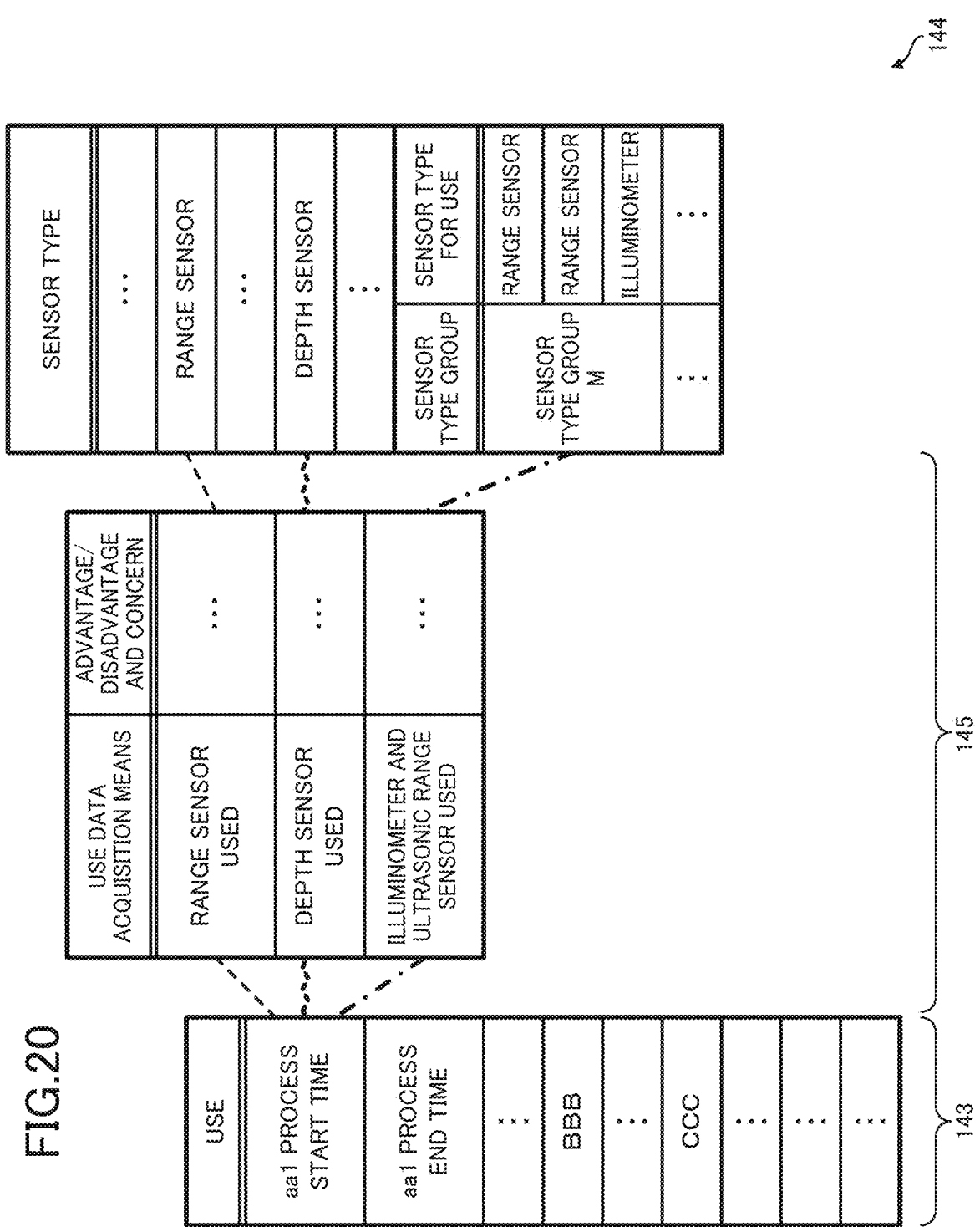
FIG. 20 is a diagram illustrating the relationship between use information, installed-sensor information, and associated-sensor information in Embodiment 2.

FIG. 19 illustrates registration processing in the present embodiment. This registration processing corresponds to the registration processing illustrated in FIG. 4 without steps S11 and S12. In the use registration processing, however, the use is registered without being associated with the line, the process, and the facility. FIG. 20 illustrates information registered with the storage 14 through the registration processing. As illustrated in FIG. 20, the use and the sensor type or the sensor type group for achieving the use are defined in association with each other. The installed-sensor information 144 registered in the registration processing simply indicates the sensor type, and the details are added in the processing described later. The sensor type group indicates a group of multiple types of sensors. The sensor type and the sensor type group registered in the registration processing are hereafter collectively and simply referred to as a sensor type as appropriate.

Figure 21:
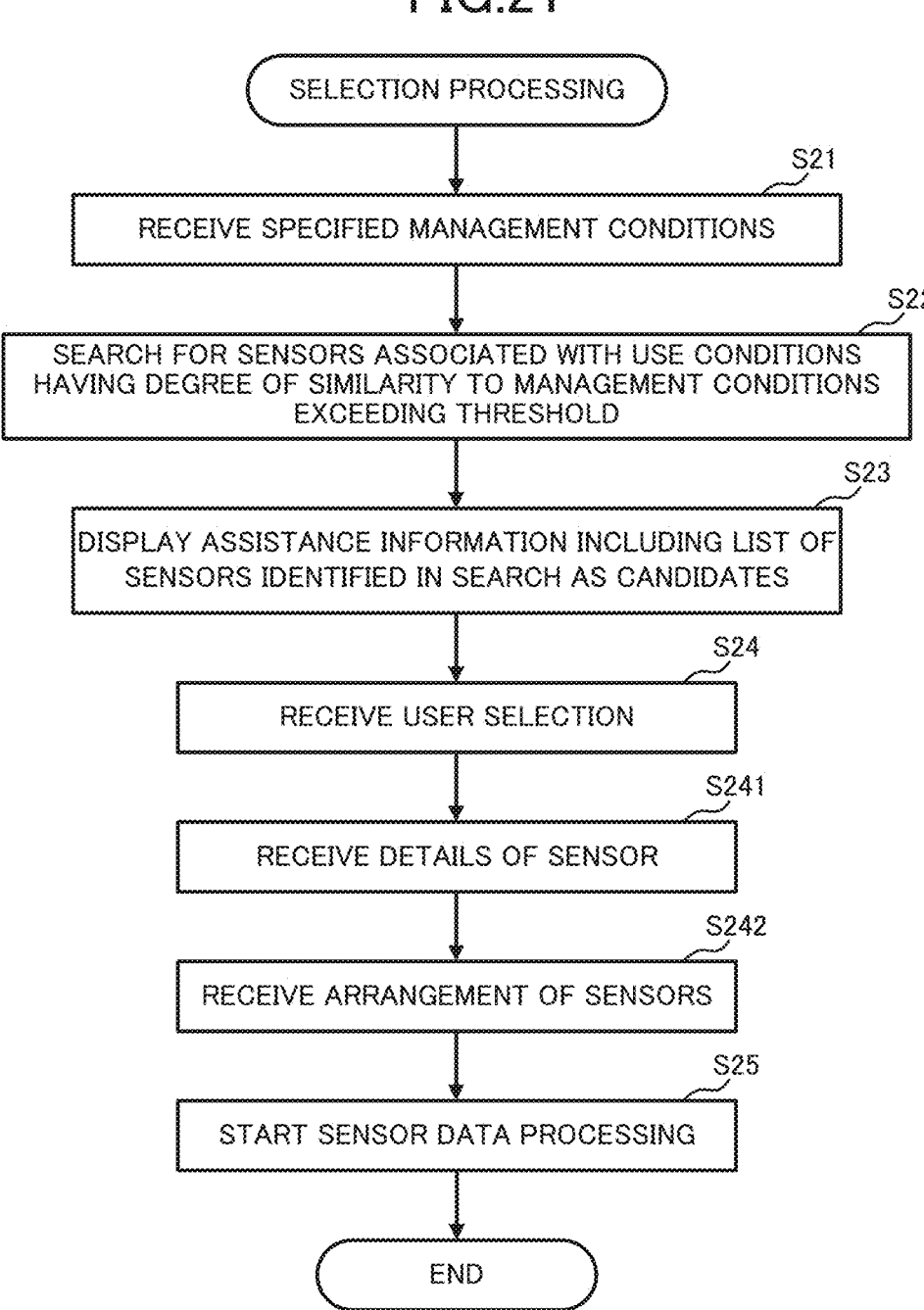
FIG. 21 is a flowchart of selection processing in Embodiment 2.
Figure 22:
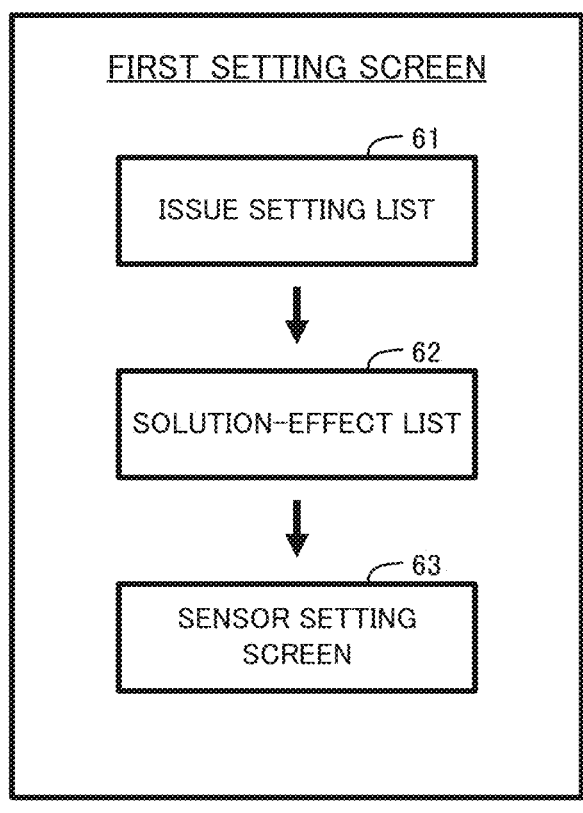
FIG. 22 is a diagram of an example of a first setting screen in Embodiment 2.

FIG. 21 illustrates selection processing in the present embodiment. In this selection processing, the receiver 11 receives management conditions specified by the user (step S21). More specifically, the display 12 displays a first setting screen, as illustrated in FIG. 22, for setting the sensor type satisfying the user request. The first setting screen includes an issue setting list 61, a solution-effect list 62, and a sensor setting screen 63.

The issue setting list 61 lists the uses intended by the user using data for line management. The user selects the use matching the user request from the issue setting list 61 as an issue.

Referring back to FIG. 21, step S22 is performed subsequent to step S21 as in Embodiment 1. Instead, in step S22, the searcher 15 may search for the sensor type corresponding to the use conditions matching the use of the management conditions received in step S21. In this case, the use conditions indicate the uses registered as illustrated in FIG. 20. Instead, the searcher 15 may search for, as the use conditions, the use specified with a character string similar to the character string indicating the use as the management conditions.

Subsequently, the display 12 displays assistance information including the list of the sensor type candidates (step S23). More specifically, the display 12 displays, in the solution-effect list 62 illustrated in FIG. 22, combinations of the sensor type searched for in step S22 corresponding to the use selected from the issue setting list 61 and the effect acquired when the sensor type is used. In this case, the display 12 may also display the sensor types included in the sensor type group.

Subsequently, the receiver 11 receives a selection performed by the user (step S24). More specifically, the user selects, in consideration of the effects included in the solution-effect list 62, any of the sensor types displayed as the candidates, and the receiver 11 receives the selection performed by the user.

Subsequently, the receiver 11 receives the details of the sensor 40 (step S241). More specifically, through the sensor setting screen 63 in the first setting screen appearing on the display 12 as in FIG. 22, the user sets the details of the sensor 40 belonging to the selected sensor type. Thus, the installed-sensor information 144 as illustrated in FIG. 12 is registered.

Figure 23:
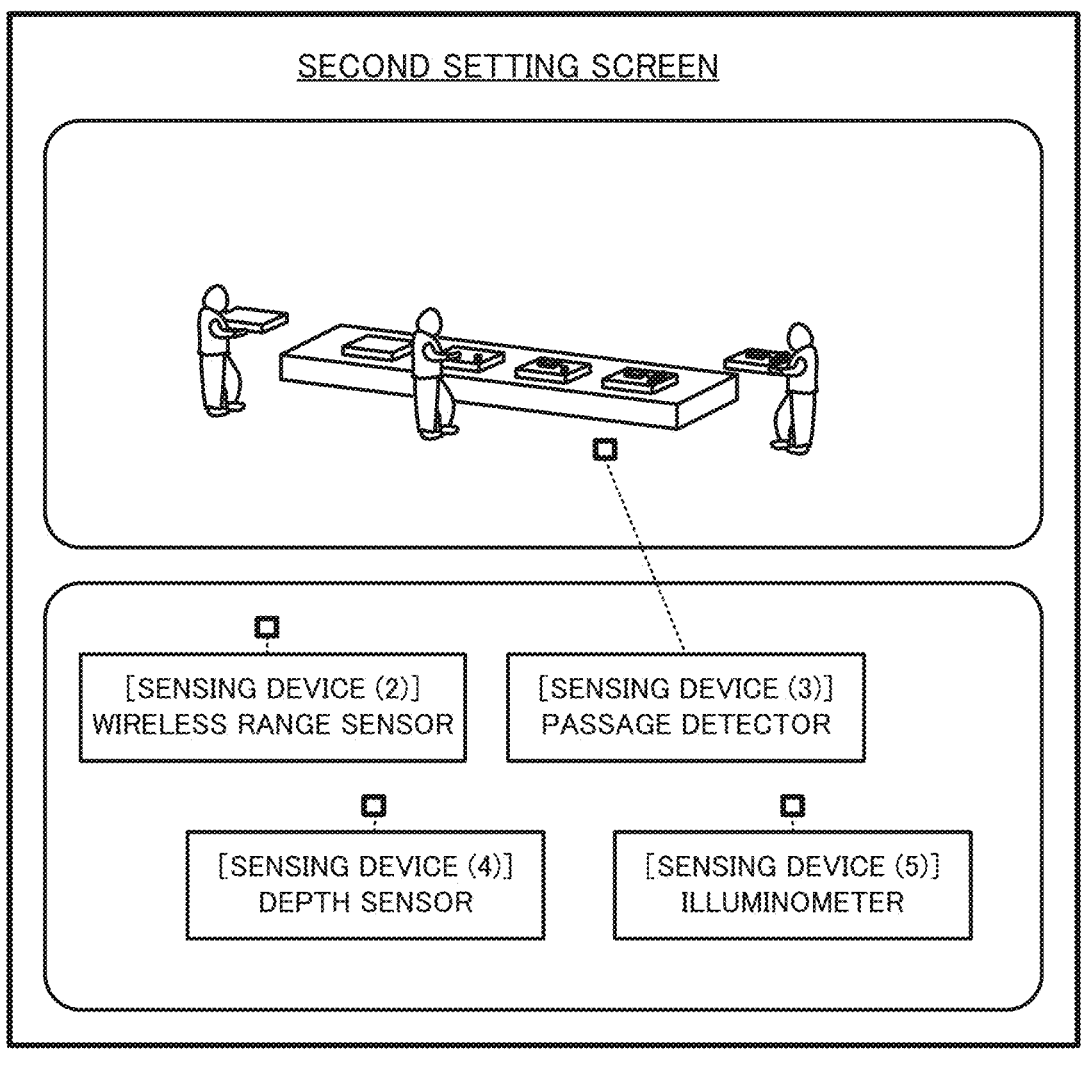
FIG. 23 is a diagram of a first example of a second setting screen in Embodiment 2.

Subsequently, the receiver 11 receives the setting of the arrangement of the sensors 40 from the user (step S242). Step S242 corresponds to registration of the line and the process performed by the line registerer 131 and the process registerer 132 in Embodiment 1. More specifically, the display 12 displays a second setting screen, as illustrated in FIG. 23, indicating the set sensors 40 and the line on which the sensors 40 are installed. On the second setting screen, the user superimposes an object corresponding to the sensor on the image of the line through a drag-and-drop operation. To arrange a sensor group, the user may superimpose the object corresponding to the sensor group through a drag-and-drop operation while maintaining the relative positional relationship between the sensors 40 included in the sensor group.

After the superimposition of the sensors 40 on the image of the line on the second setting screen ends, the display 12 prompts the user to set the data acquisition area. The data acquisition area indicates the area on the line on which the sensor 40 acquires data. For example, the user sets the data acquisition area as indicated with a bold broken block in FIG. 24.

Figure 25:
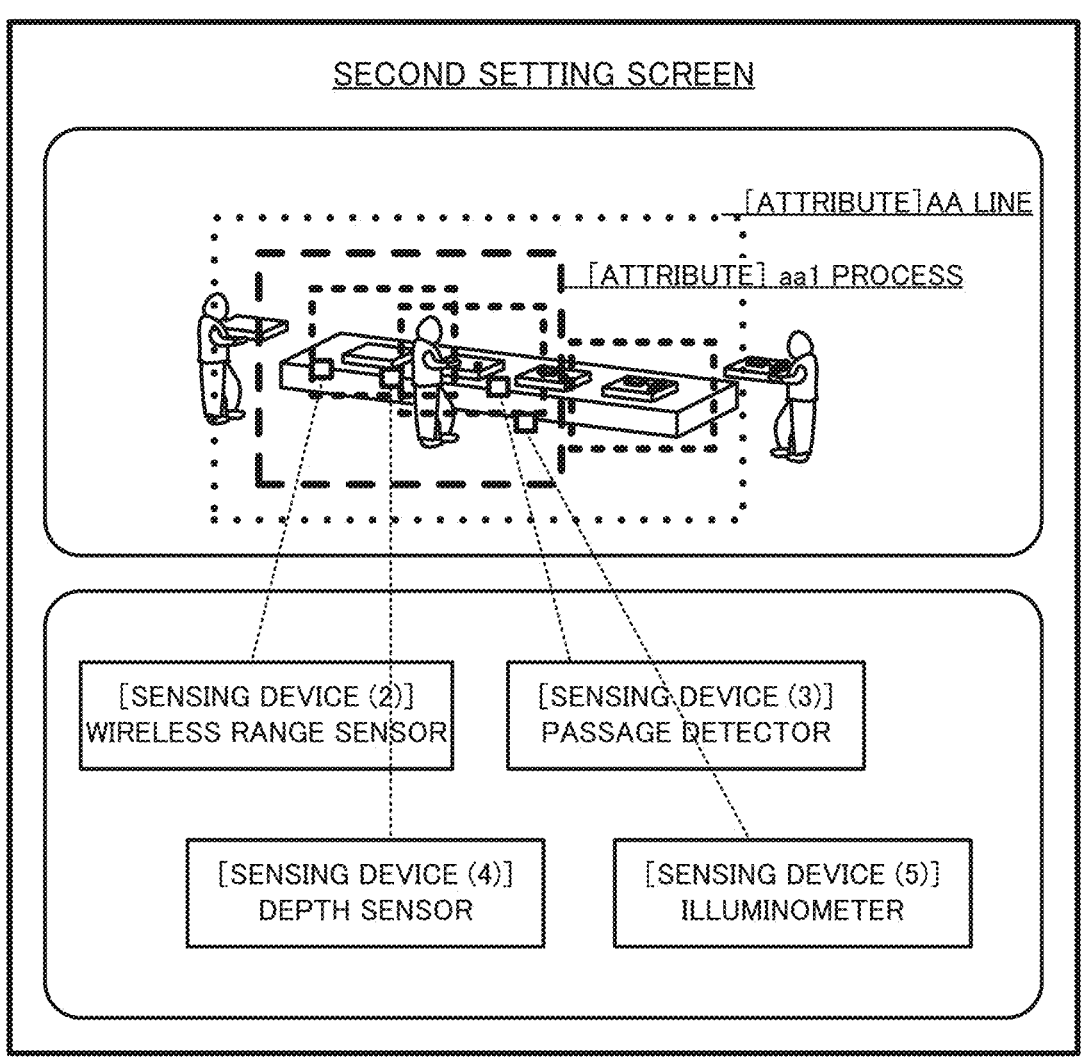
FIG. 25 is a diagram of a third example of the second setting screen in Embodiment 2.

As illustrated in FIG. 25, the user may set multiple data acquisition areas on the line, or may set a data acquisition area overlapping another area. The line management assistance device 100 can hierarchically manage the sensors 40 using the area set to overlap another area. For example, when an area corresponding to a process is set within an area corresponding to the line, the line, the process included in the line, and the sensors 40 corresponding to the process can be hierarchically managed.

The user can also associate attributes such as a name with the set area. Associating the attributes corresponds to setting the line name and the process name illustrated in FIGS. 5 and 6. The attributes associated with the area are associated with the data from the sensors 40 acquired in this area as metadata.

Referring back to FIG. 21, subsequent to step S242, the line management assistance device 100 performs the processing in step S25 as in Embodiment 1, and ends the selection processing.

As described above, Embodiment 2 in which sensor type candidates corresponding to the uses received from the user are displayed in a table produces the same effects as Embodiment 1. More specifically, the user selecting the sensor type through an input of the use and setting the details and the arrangement of the sensors provides information associated with metadata to the host device 200. The host device 200 can thus easily perform line management.

When the host device analyzes data output from the sensor 40, the data attributes are to be clarified. More specifically, metadata is to be associated with data output from the sensor. However, associating such metadata with every set of data is time-consuming. In contrast, the line management assistance device 100 directly associates the details of the procedure for acquiring data as metadata. Thus, metadata can be associated with data without the user intentionally associating metadata with the data.

Associating metadata with data without the user intentionally associating metadata with the data is further described below.

FIG. 22 illustrates a first setting screen for setting a sensor group appropriate for the use of start-end management when, for example, the start and the end of an operation on a production line performed by an operator is to be managed (start-end management). The first setting screen is used to set a first data set (described later). The first setting screen corresponds to the use registerer 133 and the installed-sensor registerer 134 and to the corresponding use information 143 and the corresponding installed-sensor information 144 in Embodiment 1.

The first data set is data acquired for one or more sensors corresponding to the data acquisition use (issue solution use). The setting at the use registerer 133 and the installed-sensor registerer 134 in Embodiment 1 corresponds to setting the first data set. The setting at the first setting screen in Embodiment 2 corresponds to setting the first data set.

The first setting screen includes the issue setting list 61, the solution-effect list 62, and the sensor setting screen 63. Information included in these lists and the setting screen is preregistered with, for example, a method in Embodiment 1.

The issue setting list 61 lists items registered by the user as issues (uses) in the start-end management, such as lot start and end, operation start and end, and in-operation or non-operation. The solution-effect list 62 lists the sensor as a solution for each item of the issue selected from the issue setting list 61, a sensor configuration example, and an effect (advantage or disadvantage) of the solution. The sensor configuration includes, for example, multiple sets of notification sensors. Examples of the effect include reduced detection failure and noise elimination with an appropriate combination of notification sensors.

The user selects an issue (use) to be solved from the issue setting list 61, and selects, through the solution-effect list 62 displayed corresponding to the selection, an intended sensor or sensor group for addressing the issue (use) after checking the sensor configuration and the effect. This selection ends the setting of the first data set.

The sensor setting screen 63 is used to set at least one of the sensor or the sensor group, or for example, the screen illustrated in FIGS. 9 and 10 in Embodiment 1. The sensor setting screen 63 corresponds to the installed-sensor registerer 134 and the installed-sensor information 144 in Embodiment 1. On the sensor setting screen 63, the user performs the data acquisition setting of the sensor or the sensor group for acquiring the acquisition accuracy of the use data (production data). In this data acquisition setting, for example, the distance between the sensors, the detection sensitivity, or the data acquisition interval is set. Based on the setting information, a computational logic is formed for eliminating acquired production data sets that overlap between multiple sensors. As described above in Embodiment 1, clarifying the distance between the sensors and the time taken for moving products (workpieces) allows formation of a computational logic for inferring data sets that overlap between production data sets.

Subsequently, as illustrated in FIG. 23, after the user ends setting the sensor or sensor group, the line management assistance device 100 displays the second setting screen listing the set sensor or sensor group and the production line on which the sensor or sensor group is installed. On the second setting screen, the user superimposes the sensor or sensor group on the image of the production line through, for example, a drag-and-drop operation. The user may superimpose a sensor group through a drag-and-drop operation while maintaining the relative positional relationship in the sensor group.

Figure 24:
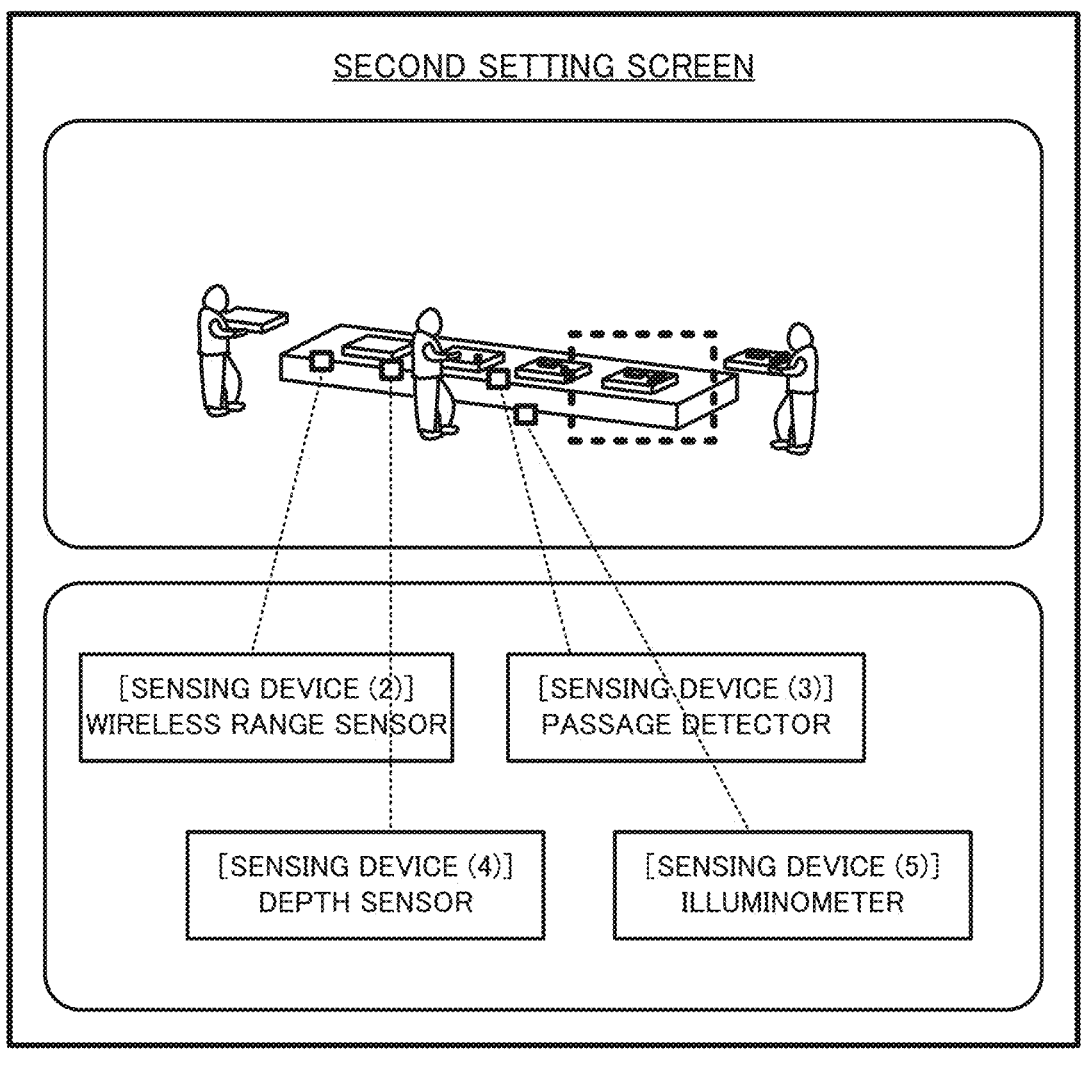
FIG. 24 is a diagram of a second example of the second setting screen in Embodiment 2.

After the superimposition of the sensor or sensor group on the image of the production line ends, as illustrated in FIG. 24, the line management assistance device 100 prompts the user to set the data acquisition area of the sensor or sensor group to determine the area of the production line to be covered by the sensor or sensor group to acquire data. When the user ends setting the data acquisition area indicated with a broken frame illustrated in FIG. 24, the line management assistance device 100 sets a production-data acquisition area (sensor or sensor group arrangement area) as the second data set. As illustrated in FIG. 25, the line management assistance device 100 can set the production-data acquisition area (sensor or sensor group arrangement area) in another area in the production line, or over another acquisition area (arrangement area) that has already been set in an overlapping manner. The line management assistance device 100 sets the acquisition area (arrangement area) in an overlapping manner to hierarchically manage the production data (use data). The above second data set corresponds to the data set managed in the acquisition area (arrangement area).

As illustrated in FIGS. 24 and 25, the line management assistance device 100 can name the production data (use data) specified by the acquisition area (arrangement area) through the user operation. More specifically, the line management assistance device 100 associates metadata with the production data (use data).

As described above, managing the production data (use data) as the second data set by setting the acquisition area (arrangement area), and managing the acquisition area (arrangement area) while naming the acquisition area (arrangement area) are specifically performed in the manner described below. The line management assistance device 100 associates the area information or the name information used for the second data set with the production data in the first data set managed at the storage 14 such as a database. The second setting screen in the line management assistance device 100 corresponds to the line registerer 131 and the process registerer 132 and to the corresponding line information 141 and the corresponding process information 142 in Embodiment 1. An area setting at a level higher than that of the process registerer 132 corresponds to the line registerer 131.

Figure 26:
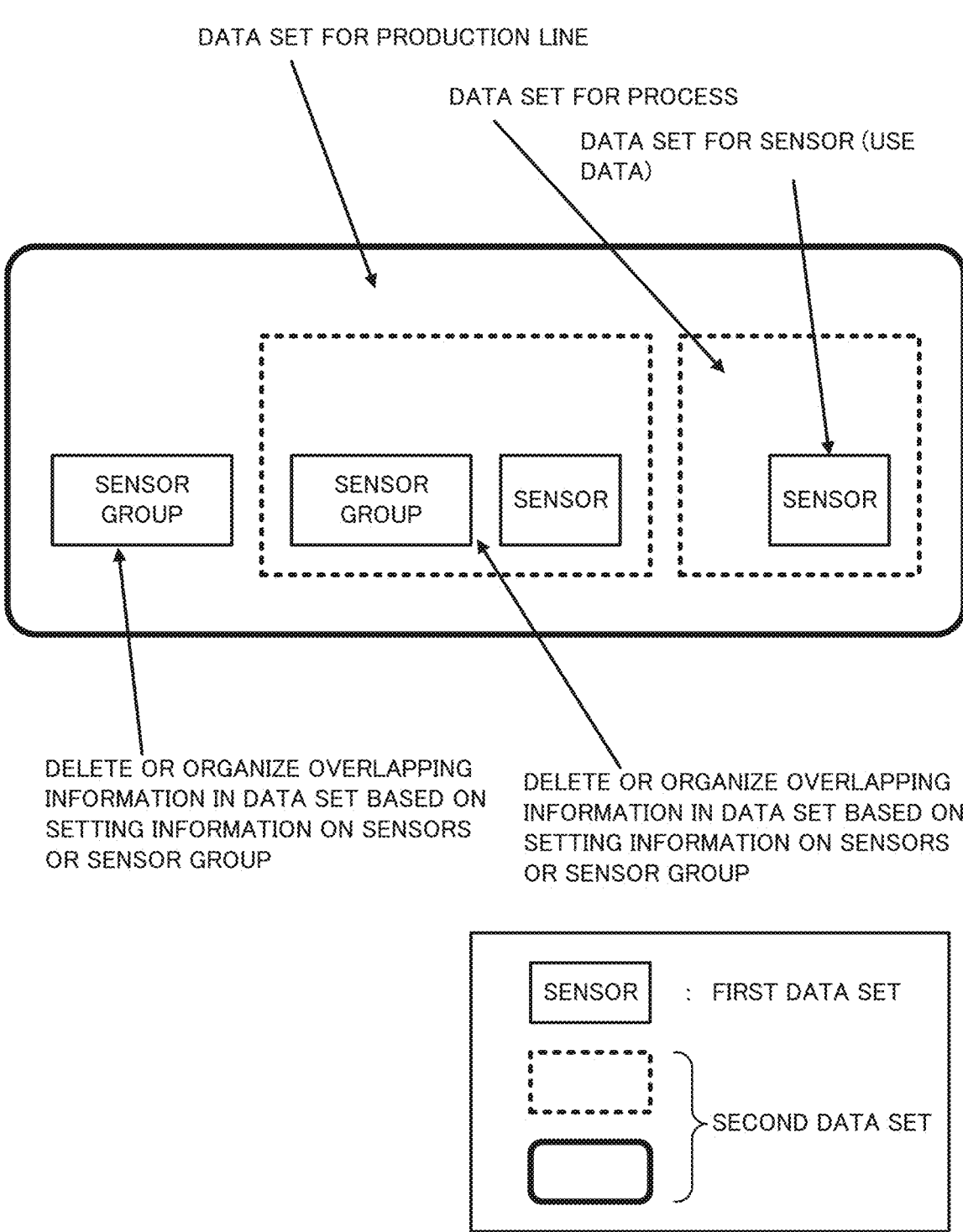
FIG. 26 is a diagram illustrating the setting of a sensor and a sensor group in Embodiment 2 directly used as the setting of metadata.

FIG. 26 illustrates the relationship between the first data set and the second data set. These data sets systematically store information used for data analysis in a host system. These data sets have configurations set by the user in accordance with the first and second setting screens.

More specifically, the line management assistance device 100 acquires production data (use data) from the production line based on the setting information set through the first and second setting screens, and processes the acquired production data (for example, deletes overlapping data sets or associates metadata) based on the setting information to acquire easily analyzable data or useful data.

The line management assistance device 100 according to one or more embodiments of the present disclosure is applicable to various operations. For example, the line management assistance device 100 is applicable to assisting in introduction of a system for automatically acquiring and managing the start and end time of each manufacturing process using, for example, sensors.

Achievement data on the start and end time for each manufacturing process is highly useful for, for example, manufacturing operation management, cost management, or production site improvement. Such achievement data has been typically acquired through, for example, manual measurement using a stopwatch. To save person-hours used in such manual measurement, many manufactures may intend to introduce a system for automatically, daily, and continuously acquire and manage data using sensors. However, introducing such a system to automatically acquire achievement data involves the difficulties described above. The line management assistance device 100 according to one or more embodiments of the present disclosure may be effectively usable to assist in introducing such a system.

Although the embodiments of the present disclosure have been described above, the present disclosure is not limited to the above embodiments.

For example, the line management assistance device 100 may output information to a built-in storage or a non-transitory recording medium without outputting the information to the host device 200 and accumulate the information for later verification.

Although the line management assistance device 100 searches for the use conditions similar to the management conditions to a predetermined degree, the line management assistance device 100 may search for the use conditions matching the management conditions, excluding the use conditions different from the management conditions.

Although being described as a PLC for example, the line management assistance device 100 may be another FA device or a device dedicated to management of the sensor group 400.

A method for calculating the degree of similarity based on the number of items in the use conditions that match the items in the management conditions has been described. Instead, the degree of similarity may be calculated differently.

The functions of the line management assistance device 100 may be implemented by dedicated hardware or a common computer system.

For example, the program P1 executed by the processor 101 may be stored in a non-transitory computer-readable recording medium for distribution, and installed on a computer to provide a device that performs the above processing. Examples of such a non-transitory recording medium include a flexible disk, a compact disc read-only memory (CD-ROM), a digital versatile disc (DVD), and a magneto-optical (MO) disk.

The program P1 may be stored in a disk device included in a server device on a communication network such as the Internet, and for example, superimposed on a carrier wave and downloaded to a computer.

The above processing may be performed by launching and executing the program P1 while the program P1 is being transferred through a communication network.

The above processing may be performed by entirely or partially executing the program P1 on a server device while a computer is transmitting and receiving information on the processing through a communication network.

In the system with the above functions implementable partly by the operating system (OS) or through cooperation between the OS and applications, portions executable by applications other than the OS may be stored in a non-transitory recording medium that may be distributed or may be downloaded to the computer.

Means for implementing the functions of a diagnosis device 10 is not limited to software, and may be partially or entirely implemented by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The structure according to one or more embodiments of the present disclosure is suitable for line management using sensors.

REFERENCE SIGNS LIST

1000 Management system
100 Line management assistance device
101 Processor
102 Main storage
103 Auxiliary storage
104 Input device
105 Output device
106 Communicator
107 Internal bus
11 Receiver
12 Display
13 Registerer
131 Line registerer
132 Process registerer
133 Use registerer
134 Installed-sensor registerer
135 Associated-sensor registerer
14 Storage
141 Line information
142 Process information
143 Use information
144 Installed-sensor information
145 Associated-sensor information
15 Searcher
16 Acquirer
17 Outputter
200 Host device
30 Network
401, 402, 403, 40n Sensor
400 Sensor group
50 to 52 Facility
61 Issue setting list
62 Solution-effect list
63 Sensor setting screen
B1 to B3 Selection button
D1 Sensor output value
D10 Output value
D20 Condition information
D30 Output information
L1 First Line
L2 Second Line
P1 Program

The invention claimed is:

1. A line management assistance device connectable to at least two sensors installed on a line and connectable to a host device, the line management assistance device comprising:
   a registerer to register the installed at least two sensors and use conditions for the at least two sensors in association with each other;
   a receiver to receive a management condition specified as a condition for managing the line;
   a display to display assistance information indicating a list of candidates for a sensor to be used to manage the line, the candidates being one or more sensors associated with a use condition of the registered use conditions, the use condition having a degree of similarity to the management condition exceeding a threshold;
   an acquirer to acquire data output from the one or more sensors being the candidates selected from the list; and
   an outputter to output, to the host device, output information acquired by associating condition information as metadata with the data or a resultant acquired by performing a predetermined operation on the data, the condition information indicating the use condition associated with the selected one or more sensors being the candidates.

2. The line management assistance device according to claim 1, wherein
   the outputter outputs the output information acquired by associating the condition information with a resultant acquired by performing a predetermined operation on the data.

3. The line management assistance device according to claim 1, wherein
   the condition information includes at least one of information on the line, information on a process included in the line, information on the selected one or more sensors being the candidates, or information indicating an intended use of the one or more sensors.

4. The line management assistance device according to claim 1, wherein
   the management condition includes an intended use of the one or more sensors.

5. A line management assisting method to be implemented by a line management assistance device connectable to at least two sensors installed on a line and connectable to a host device, the line management assisting method comprising:
   registering, by a registerer, the installed sensors and use conditions for the sensors in association with each other;
   receiving, by a receiver, a management condition specified as a condition for managing the line;
   displaying, by a display, assistance information indicating a list of candidates for a sensor to be used to manage the line, the candidates being one or more sensors associated with a use condition of the registered use conditions, the use condition having a degree of similarity to the management condition exceeding a threshold;
   acquiring, by an acquirer, data output from the one or more sensors being the candidates selected from the list; and
   outputting, by an outputter, to the host device, output information acquired by associating condition information as metadata with the data or a resultant acquired by performing a predetermined operation on the data, the condition information indicating the use condition associated with the selected one or more sensors being the candidates.

6. A non-transitory recording medium storing a program, the program causing a line management assistance device connectable to at least two sensors installed on a line and connectable to a host device to function as
   a registerer to register the installed sensors and use conditions for the sensors in association with each other,
   a receiver to receive a management condition specified as a condition for managing the line,
   a display to display assistance information indicating a list of candidates for a sensor to be used to manage the line, the candidates being one or more sensors associated with a use condition of the registered use conditions, the use condition having a degree of similarity to the management condition exceeding a threshold,
   an acquirer to acquire data output from the one or more sensors being the candidates selected from the list, and
   an outputter to output, to the host device, output information acquired by associating condition information as metadata with the data or a resultant acquired by performing a predetermined operation on the data, the condition information indicating the use condition associated with the selected one or more sensors being the candidates.

* * * * *